United States Patent
Shinagawa et al.

(10) Patent No.: US 7,448,348 B2
(45) Date of Patent: *__Nov. 11, 2008__

(54) HYDROGEN-FUELED INTERNAL COMBUSTION ENGINE

(75) Inventors: Tomohiro Shinagawa, Susono (JP); Takashi Atsumi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 207 days.

This patent is subject to a terminal disclaimer.

(21) Appl. No.: 10/572,904

(22) PCT Filed: Oct. 6, 2004

(86) PCT No.: PCT/JP2004/015104

§ 371 (c)(1), (2), (4) Date: Mar. 21, 2006

(87) PCT Pub. No.: WO2005/038228

PCT Pub. Date: Apr. 28, 2005

(65) Prior Publication Data

US 2007/0028905 A1 Feb. 8, 2007

(30) Foreign Application Priority Data

Oct. 21, 2003 (JP) .............................. 2003-360152
Apr. 12, 2004 (JP) .............................. 2004-116609

(51) Int. Cl.
*F02B 13/00* (2006.01)

(52) U.S. Cl. .............................. 123/3; 123/575; 60/302

(58) Field of Classification Search ................. 123/575, 123/3, 1 A, DIG. 12, 295, 431, 304, 2, 514–520; 220/4.12–4.15; 423/650–654; 60/299–302
See application file for complete search history.

(56) References Cited

U.S. PATENT DOCUMENTS

| | | | | |
|---|---|---|---|---|
| 3,477,610 A | * | 11/1969 | Hansen | 220/495.01 |
| 4,318,369 A | | 3/1982 | Cronyn | |
| 5,038,960 A | * | 8/1991 | Seery | 220/723 |
| 5,275,000 A | | 1/1994 | Coffinberry et al. | |
| 5,373,818 A | | 12/1994 | Unger | |
| 5,538,697 A | * | 7/1996 | Abe et al. | 422/171 |
| 5,733,518 A | * | 3/1998 | Durante et al. | 423/248 |
| 6,641,795 B2 | * | 11/2003 | Abe | 423/648.1 |

(Continued)

FOREIGN PATENT DOCUMENTS

DE 199 31 104 A1 1/2001

(Continued)

*Primary Examiner*—Stephen K. Cronin
*Assistant Examiner*—Hyder Ali
(74) *Attorney, Agent, or Firm*—Oliff & Berridge, PLC

(57) ABSTRACT

The present invention relates to a system that is capable of freely selecting one or two or more types of fuel and supplying the selected types of fuel to an internal combustion engine. Disclosed is a hydrogen-fueled internal combustion engine that operates upon receipt of one or more types of fuel that are selected from hydrogenated fuel and a dehydrogenated product and hydrogen, which are obtained by dehydrogenating the hydrogenated fuel. The hydrogen-fueled internal combustion engine comprises: a hydrogenated fuel storage section; reaction means for invoking a dehydrogenation reaction; separation means for separating hydrogen-rich gas and dehydrogenated product; and a dehydrogenated product storage section for storing the separated dehydrogenated product.

10 Claims, 6 Drawing Sheets

U.S. PATENT DOCUMENTS

| | | | |
|---|---|---|---|
| 6,827,047 B2 * | 12/2004 | Qian et al. | 123/3 |
| 6,924,054 B2 * | 8/2005 | Prasad et al. | 429/34 |
| 7,089,907 B2 * | 8/2006 | Shinagawa et al. | 123/295 |
| 7,270,907 B2 * | 9/2007 | Becerra et al. | 429/34 |
| 2003/0168023 A1 | 9/2003 | Anderson et al. | |
| 2003/0168024 A1 | 9/2003 | Qian et al. | |

FOREIGN PATENT DOCUMENTS

| | | |
|---|---|---|
| EP | 1 236 679 A2 | 9/2002 |
| JP | A 1-170752 | 7/1989 |
| JP | B2 3-9091 | 2/1991 |
| JP | B2 5-18761 | 3/1993 |
| JP | A 6-159096 | 6/1994 |
| JP | A 2000-213444 | 8/2000 |
| JP | A-2000-291499 | 10/2000 |
| JP | A 2000-297706 | 10/2000 |
| JP | A 2001-110437 | 4/2001 |
| JP | A 2002-255503 | 9/2002 |
| JP | A 2003-184667 | 7/2003 |
| WO | WO 03/042521 A2 | 5/2003 |

* cited by examiner

HYDROGEN-FUELED INTERNAL COMBUSTION ENGINE

TECHNICAL FIELD

The present invention relates to a hydrogen-fueled internal combustion engine, and more particularly to a hydrogen-fueled internal combustion engine that is capable of using hydrogenated fuel or hydrogen-rich gas and dehydrogenated product, which are generated in a vehicle, as fuel.

BACKGROUND ART

A gasoline engine, which is gasoline-fueled, has been widely used as a source of power for driving an automobile. A mixture of gasoline, which is main fuel, and air is generally burned to put the gasoline engine into motion. In recent years, however, efforts have been made to commercialize a technology for adding hydrogen to the above air-fuel mixture.

It is also estimated that hydrogen will be increasingly used as automotive fuel not only in gasoline engines, diesel engines, hydrogen engines, and other internal combustion engines, but also in fuel cells for use in an electric automobile and other hydrogen-powered apparatuses other than engines.

In reality, however, the technology concerning a hydrogen supply method is still not established. Therefore, when hydrogen is to be supplied to an internal combustion engine, fuel cell, or the like, it is necessary that the vehicle carry hydrogen or hydrogen-generating raw fuel. More specifically, when the vehicle is to carry hydrogen, hydrogen-rich gas is compressed to a high-pressure gas or liquefied and filled into a steel cylinder (e.g., high-pressure tank or liquid hydrogen tank). An alternative is to use a hydrogen storage alloy or hydrogen adsorption material for storing hydrogen. When the vehicle is to carry raw fuel, the vehicle incorporates methanol, gasoline, or other hydrocarbon as the raw fuel and a hydrogen generator for generating hydrogen-rich gas by steam-reforming the raw fuel.

However, if the vehicle carries hydrogen that is compressed into a high-pressure tank, the hydrogen storage amount is small because the high-pressure tank has a thick wall and cannot provide an adequate inner volume although the tank is large. If the vehicle carries liquid hydrogen, the overall energy efficiency is not high because it entails a vaporization loss and requires a large amount of energy for liquefaction. If the hydrogen storage alloy or hydrogen adsorption material is used, the resulting hydrogen storage density is inadequate and it is very difficult to control hydrogen storage and adsorption. It is also necessary to furnish facilities for compressing, liquefying, and storing hydrogen.

Meanwhile, when the vehicle carries raw fuel, a single fuel refill provides a longer traveling distance than the use of hydrogen. Hydrocarbon raw fuel can be transported and otherwise handled more easily than the hydrogen-rich gas. Further, when hydrogen burns, it combines with oxygen in the air to form water, thereby presenting no environmental pollution hazard.

Decalin (decahydronaphthalene), which is one of hydrocarbon raw fuel, for example, can be handled easily because the vapor pressure is approximately zero at normal temperature (the boiling point is approximately 200° C.). Therefore, decalin is highly expected to be used as raw fuel.

In a known method for dehydrogenating decalin, decalin is irradiated with light in the presence of a transition metal complex including at least one transition metal that is selected from among cobalt, rhodium, iridium, iron, tellurium, nickel, and platinum (refer, for instance, to Patent Document 1). In a known method for producing hydrogen from decalin, decalin is irradiated with light in the presence of a rhodium complex, which is an organic phosphorous compound, or in the presence of an organic phosphorous compound and rhodium compound (refer, for instance, to Patent Document 2). Decalin dehydrogenation occurs as indicated below:

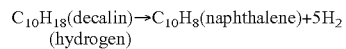

A hydrogen fuel supply system that uses decalin, cyclohexane, or other organic hydride as raw fuel is also disclosed (refer, for instance, to Patent Documents 3 and 4).

[Patent Document 1]
Japanese Patent Publication No. 9091/1991
[Patent Document 2]
Japanese Patent Publication No. 18761/1993
[Patent Document 3]
Japanese Patent Laid-Open No. 110437/2001
[Patent Document 4]
Japanese Patent Laid-Open No. 255503/2002

DISCLOSURE OF INVENTION

A first object of the present invention is to provide a system for supplying the organic hydride, hydrogenated gasoline, hydrogenated light oil, or other hydrogenated fuel (hereinafter referred to as the hydrogenated fuel) to a gasoline engine, diesel engine, hydrogen engine, or other internal combustion engine directly or after decomposition.

A second object of the present invention is to provide a system for generating hydrogen-rich gas and dehydrogenated gasoline from hydrogenated gasoline containing an organic hydride and supplying the generated hydrogen-rich gas and dehydrogenated gasoline to the internal combustion engine as fuel.

The above first object is achieved by a hydrogen-fueled internal combustion engine that operates upon receipt of one or two or more types of fuel that are selected from hydrogenated fuel and a dehydrogenated product and hydrogen, which are obtained by dehydrogenating the hydrogenated fuel, the hydrogen-fueled internal combustion engine comprising: a hydrogenated fuel storage section; reaction means that includes a catalyst that is positioned to be heatable and dehydrogenates hydrogenated fuel, which is supplied from the hydrogenated fuel storage section, on the catalyst that is heated; separation means for separating hydrogen-rich gas and a dehydrogenated product that are derived from dehydrogenation; and a dehydrogenated product storage section for storing the separated dehydrogenated product.

The above second object of the present invention is achieved by a hydrogen-fueled internal combustion engine comprising: a hydrogenated gasoline tank for storing hydrogenated gasoline containing an organic hydride; fuel separation means for separating the hydrogenated gasoline into hydrogen-rich gas and dehydrogenated gasoline; and fuel supply means for supplying at least the hydrogen-rich gas and/or the dehydrogenated gasoline on an individual basis or simultaneously, among the hydrogenated gasoline, the hydrogen-rich gas, and the dehydrogenated gasoline, to the internal combustion engine as fuel.

BEST MODE FOR CARRYING OUT THE INVENTION

Embodiments of a hydrogen-fueled internal combustion engine according to the present invention will now be described with reference to the accompanying drawings. The following description of the embodiments basically assumes that a gasoline engine is mounted in a vehicle to use hydrogenated gasoline as hydrogenated fuel. However, the present invention is not limited to the embodiments described below.

FIRST EMBODIMENT

With a dehydrogenation reactor mounted in an automobile that carries a gasoline-fueled engine, the first embodiment can directly supply hydrogenated gasoline to the engine or let the hydrogenated gasoline react in the presence of a high-temperature catalyst to generate hydrogen-rich gas and dehydrogenated product (gasoline), separate them, make an arbitrary selection, and supply the selection to the engine. The present embodiment can also mix the hydrogen-rich gas, which is derived from dehydrogenation reaction, with exhaust gas, and feed the resulting mixture through a catalyst to purify the exhaust gas.

Figure 1:
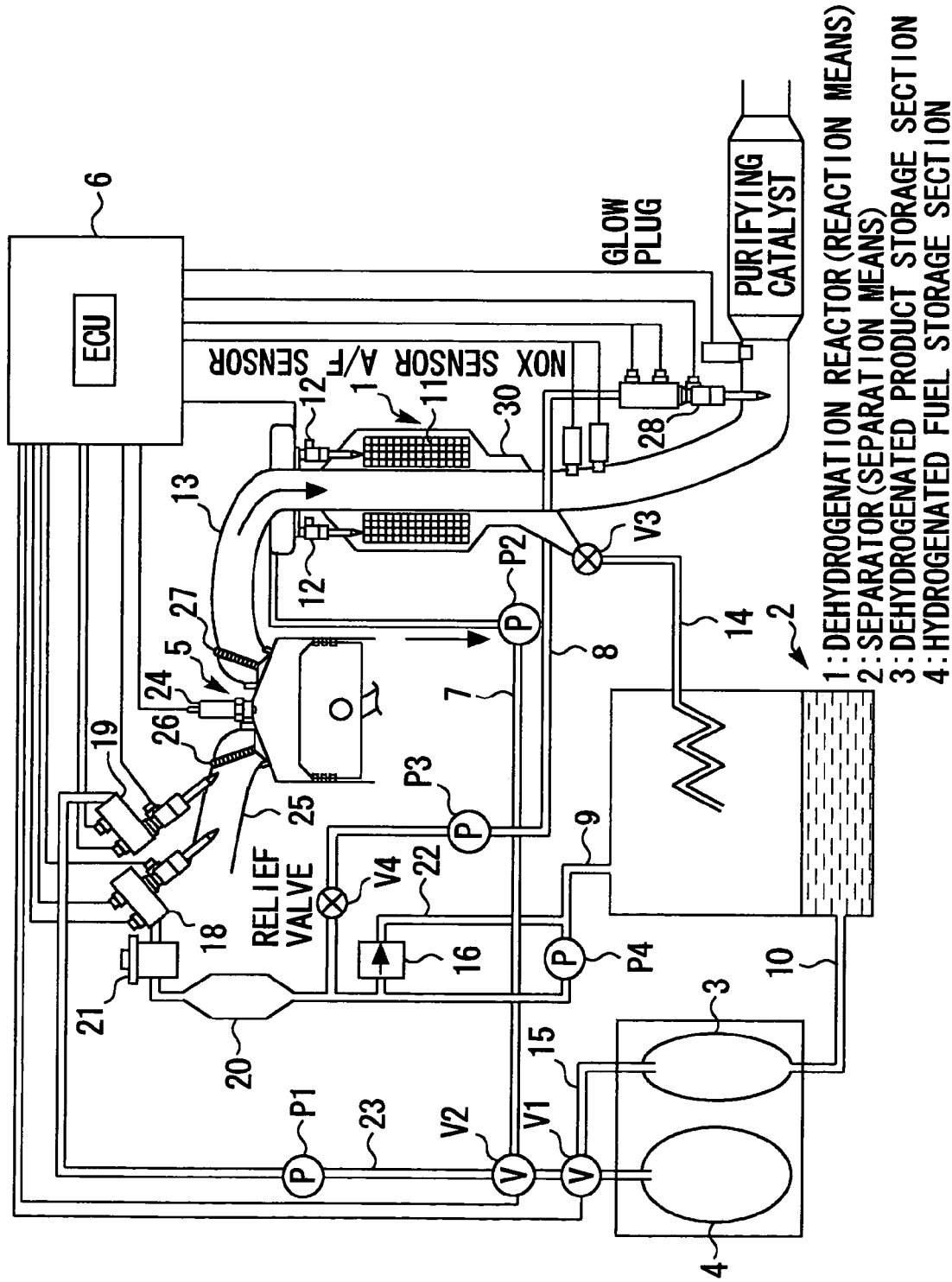
FIG. 1 schematically shows the configuration of a first embodiment of the present invention.

The present embodiment is configured as shown in FIG. 1, and will now be described in detail with reference to FIG. 1.

The hydrogenated gasoline is supplied from the outside to a hydrogenated fuel storage section 4. The hydrogenated fuel storage section 4 is a tank that is shared by a dehydrogenated product storage section 3, which is used after hydrogen separation as described later.

In the present embodiment, the hydrogenated gasoline can be directly supplied to the internal combustion engine from the hydrogenated fuel storage section 4 via valves V1 and V2 by using a pump P1 and an injector 19. Thus, the hydrogenated gasoline can be directly used as the fuel for the internal combustion engine.

The hydrogenated gasoline can also be supplied to a dehydrogenation reactor (reaction means) 1 via valves V1 and V2 by using a pump P2 that is installed in a supply piping 7.

In the present embodiment, the dehydrogenation reactor (reaction means) 1 surrounds an exhaust pipe for discharging exhaust gas that comes out of the engine. The dehydrogenation reactor (reaction means) 1 contains a catalyst 11, which is provided by forming an alumina coat on the inner wall of each cell of a doughnut-shaped honeycomb carrier and making the coat to have metallic particles that serve as the catalyst. The dehydrogenation reactor 1 includes an injector (fuel injector) 12 for supplying the hydrogenated gasoline to the catalyst 11. The supplied hydrogenated gasoline is then dehydrogenated within the catalyst 11, which is heated by exhaust gas heat (exhaust heat).

Figure 2:
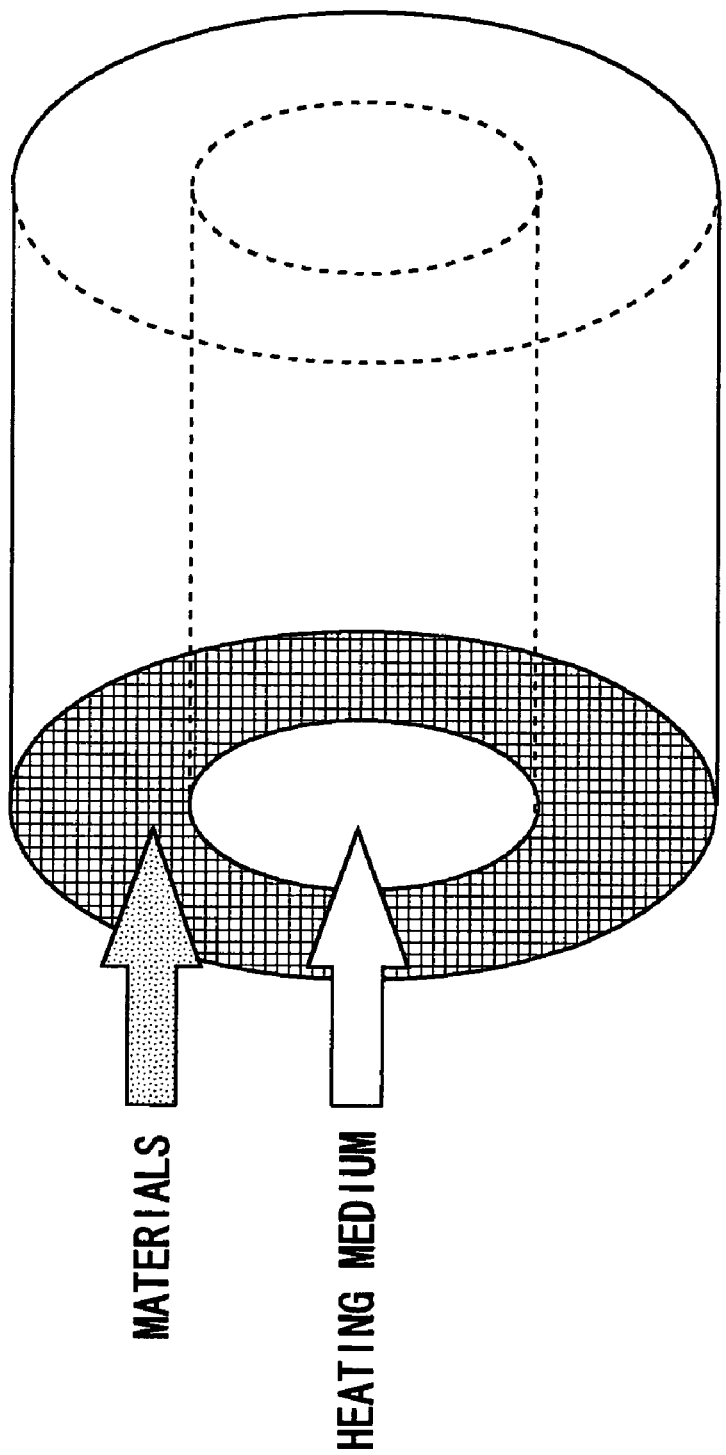
FIG. 2 is an enlarged schematic diagram illustrating a dehydrogenation reactor according to the first embodiment of the present invention.

The dehydrogenation reactor 1 will be further described with reference to FIG. 2. FIG. 2 is a perspective view illustrating the dehydrogenation reactor. As shown in this figure, the catalyst 11 is a doughnut-shaped cylinder with a hole in it. An exhaust pipe 13 may penetrate through this hole.

One end of the exhaust pipe 13 is connected to a cylinder 5 of the engine via an exhaust valve 27. The other end of the exhaust pipe 13 discharges exhaust gas via a purification catalyst (see FIG. 1).

The hydrogenated gasoline injector 12 can generate hydrogen-rich gas with high efficiency by, for instance, applying a wide-angle spray of hydrogenated gasoline onto the catalyst 11.

The downstream side of the exhaust pipe 13 is provided with a flow path 30 that runs along the exhaust pipe 13 to allow mixture gas to pass. Generated mixture gas can pass through the flow path 30 in a gaseous state without allowing a dehydrogenated product in the mixture gas to cool down and condense.

Further, the dehydrogenation reactor 1 is connected to valve V3 and one end of a return piping 14 for discharging hydrogen and dehydrogenated product. The dehydrogenation reactor 1 communicates with a separator 2 via the return piping 14.

The separator 2 cools the hydrogen and dehydrogenated product. The dehydrogenated product then liquefies and moves into the bottom of the tank so that it is separated from the hydrogen.

The top of the separator 2 is connected to one end of a piping 17 that is provided with a pump P4 and a check valve and used for hydrogen-rich gas passage. Another piping 10 is connected between the bottom of the separator 2 and the dehydrogenated product storage section 3. The separated hydrogen-rich gas passes through piping 17 and is discharged from the separator 2. The dehydrogenated product retained in the separator 2 can be introduced into the dehydrogenated product storage section 3 via piping 10.

A cylinder 5 of the engine is connected to an intake pipe 25 via an intake valve 26 and connected to an exhaust pipe 13 via an exhaust valve 27. The intake pipe 25 supplies a mixture of fuel, air, and hydrogen to the cylinder as mixture gas. The exhaust pipe 13 discharges exhaust gas. A cylinder head is provided with an ignition plug 24 for igniting the mixture gas in the cylinder.

The intake pipe 25 is provided with a hydrogen supply injector 18, which is connected to the other end of piping 17, and a gasoline supply injector 19, which is connected to one end of a supply piping 23 that has pump P1 and supplies hydrogenated gasoline (or gasoline as a dehydrogenated product). The hydrogen supply injector 18 communicates with the separator 2 via piping 17 so that hydrogen can be added into the intake pipe 25. The gasoline supply injector 19 communicates with the supply piping 23 so that gasoline can be supplied into the intake pipe 25. This configuration makes it possible to supply the mixture gas, which contains hydrogen and gasoline, to the cylinder.

Piping 17 is provided with a buffer tank 20 and a regulator 21. The buffer tank 20 not only stores hydrogen but also supplies the hydrogen to the hydrogen supply injector 18. The hydrogen supply pressure for supplying hydrogen to the hydrogen supply injector 18 is controlled as desired by the regulator 21. A bypass is provided between pump P1 and buffer tank 20. This bypass is equipped with a relief valve that avoids an undue increase in the hydrogen supply pressure.

The hydrogenated fuel storage section 4 is capable of storing hydrogenated gasoline, which is the main fuel, and supplying the hydrogenated gasoline to the gasoline supply injector 19 via the supply piping 23 that is attached to the top of the hydrogenated fuel storage section 4. After hydrogen separation, the dehydrogenated product storage section 3 can supply gasoline (dehydrogenated product) to the gasoline supply injector 19 via valve V1 in a similar manner.

The downstream side of the dehydrogenation reactor 1, which is installed in the exhaust pipe 13, is provided with a NOx sensor for detecting the nitrogen oxide (NOx) concentration in the exhaust gas, an A/F sensor for measuring the air-fuel ratio, a hydrogen addition injector 28 for adding hydrogen-rich gas to the exhaust gas on the upstream side of a three-way catalyst (purification catalyst), and a glow plug.

The hydrogen addition injector 24 is connected to one end of a piping 8 that is provided with valve V4 and pump P3, which communicate with piping 17, and capable of supplying part of the hydrogen-rich gas, which is separated by the separator 2, to the exhaust pipe 13. The hydrogen-rich gas is added to the exhaust gas in the exhaust pipe 13 and burned with the glow plug so that the exhaust gas to be discharged can be further purified.

The aforementioned hydrogenated gasoline injector 12, hydrogen supply injector 18, gasoline supply injector 19, ignition plug 24, NOx sensor, A/F sensor, hydrogen addition injector 24, and glow plug are electrically connected to an ECU (controller) 6 and controlled by it.

The control operation performed by the ECU (controller) 6 according to the present embodiment will now be described. More specifically, only a hydrogen-rich gas generation control operation according to the present invention will be described below.

First of all, when an ignition (IG) switch is turned ON, the engine starts up. A temperature sensor is then used to acquire the temperature T of the catalyst 11 and judge whether the catalyst temperature T is below a predetermined temperature T0. If the catalyst temperature T is not higher than the predetermined temperature T0, the catalyst temperature T is acquired again. If, on the other hand, the catalyst temperature T is above the predetermined temperature T0, a control driver (not shown) that is electrically connected to the ECU 6 causes each injector 12 to supply a predetermined amount of hydrogenated gasoline.

The aforementioned predetermined temperature ranges from 250 to 500° C. and more preferably from 250 to 350° C. If the predetermined temperature is below 250° C., it is practically impossible to obtain a sufficiently high dehydrogenation reaction speed, that is, obtain high performance from the internal combustion engine or other hydrogen-fueled apparatus. If the predetermined temperature exceeds 350° C., carbon deposits may arise. The use of a predetermined temperature higher than 500° C. is impractical.

When the ignition switch is turned ON in the present embodiment, the engine starts up through the use of a mixture gas that is obtained by adding air and hydrogen, which is contained in the buffer tank 20 and injected by the hydrogen addition injector 18, to the gasoline (or hydrogenated gasoline) supplied from the gasoline supply injector 19. The exhaust pipe 13 is heated by the exhaust gas that is discharged from the cylinder after startup. When the supported catalyst reaches a predetermined temperature, pump P2 is driven so that the hydrogenated fuel storage section 4 supplies hydrogenated gasoline to the catalyst 11 of the dehydrogenation reactor 1 via the supply piping 7. The hydrogen-rich gas (this gas may contain evaporated remaining hydrogenated gasoline), which is derived from dehydrogenation reaction, is supplied together with the dehydrogenated product to the separator 2 via a discharge pipe 14.

The hydrogen-rich gas supplied to the separator 2 is cooled. Further, the dehydrogenated product in the gas is liquefied and separated from the hydrogen-rich gas. The separated hydrogen-rich gas is supplied to the buffer tank 20 via piping 17 and stored. Further, the separated hydrogen-rich gas is also supplied to the exhaust pipe 13 from the hydrogen addition injector 24 that is connected to piping 8, which braches off from piping 17. The hydrogen-rich gas supplied to the buffer tank 20 for storage is supplied to the intake pipe 25 via the hydrogen supply injector 18 in accordance with gasoline supply timing. As described above, hydrogen can be generated in the vehicle by using the exhaust heat of the engine. Thus, high-purity hydrogen-rich gas can be continuously supplied to the engine to purify the exhaust gas and provide high fuel efficiency. At the same time, the exhaust gas can be further purified by adding hydrogen to it and burning it.

When the ignition switch is turned OFF with the vehicle stopped, the engine shuts down. Further, pump P2 stops rotating to shut off the hydrogenated gasoline supply from the hydrogenated gasoline injector 12, thereby bringing hydrogen-rich gas generation to a stop. A small amount of hydrogen-rich gas is generated even after the hydrogenated gasoline supply is shut off. Therefore, valve V3 opens so as to store the hydrogen-rich gas in the buffer tank 20 via the separator 2.

When the interior of the dehydrogenation reactor is cooled down after engine shutdown, valve V3 opens. Thus, the dehydrogenated product that is liquefied and left in the dehydrogenation reactor is introduced into the separator 2. The dehydrogenated product is then cooled, condensed, settled, and stored at the bottom of the tank.

The foregoing embodiment description mainly deals with an example in which hydrogenated gasoline is used as fuel. However, the same also holds true when fuel other than the aforementioned hydrogenated gasoline is used. In the foregoing embodiment, a gasoline engine is used as the internal combustion engine. However, the present invention can be applied not only to gasoline engines, but also to diesel engines, hydrogen engines, and various other internal combustion engines.

The hydrogen that is generated by a hydrogen-rich gas generator according to the present invention can be used as the fuel for an internal combustion engine (gasoline engine, diesel engine, etc.) or hydrogen engine in which hydrogen is added to gasoline, light oil, or other fuel for combustion purposes, or can be used as the supply to a fuel cell or other hydrogen-powered apparatus mounted in a vehicle.

The above description of the first embodiment does not indicate any selective use of hydrogenated gasoline, hydrogen-rich gasoline, and dehydrogenated product. However, they can be used as described below. When the internal combustion engine is to be started up, only hydrogen-rich gas may be supplied as the fuel. When gasoline is used as the fuel while the temperature is low, the emission characteristic and startability deteriorate due to low volatility at a low temperature. However, if only hydrogen-rich gas is used as the fuel for startup, excellent startability and emission characteristic can be obtained with the influence of low volatility eliminated.

After internal combustion engine startup, the hydrogen-rich gas and dehydrogenated product may be supplied in principle to the internal combustion engine as the fuel. More specifically, the remaining amount of dehydrogenated product may be monitored. While the dehydrogenated product can be supplied and the supply of gasoline is demanded, the dehydrogenated product may be constantly supplied instead of the hydrogenated gasoline. Further, the remaining amount of hydrogen-rich gas may be monitored. While the hydrogen-rich gas can be supplied, the hydrogen-rich gas may be constantly supplied to the internal combustion engine.

The hydrogenated gasoline is obtained by adding hydrogen to regular gasoline. Meanwhile, the dehydrogenated product is obtained by removing hydrogen from the hydrogenated gasoline. Therefore, the dehydrogenated product has substantially the same constituents as regular gasoline. The octane rating of fuel generally decreases when hydrogen is added to the constituents. Therefore, the octane rating of the hydrogenated gasoline is lower than that of the dehydrogenated product. Consequently, the hydrogenated gasoline is more likely to cause internal combustion engine knocking than the dehydrogenated product.

As described above, when the dehydrogenated product is generally used as the fuel in a situation where the supply of gasoline is demanded, internal combustion engine knocking can be avoided. Therefore, the use of this fuel supply method makes it possible, for instance, to enhance the quietness and output characteristic of the internal combustion engine.

Further, when hydrogen is added to gasoline fuel, it is possible to remarkably improve the fuel combustion quality and provide a much higher excess air percentage upper limit for the assurance of stable combustion than in a case where hydrogen is not added to gasoline fuel. Therefore, if hydrogen is generally added to gasoline fuel as described above, it is possible to revolutionarily improve the fuel efficiency characteristic of the internal combustion engine.

SECOND EMBODIMENT

[Configuration of Second Embodiment]

A second embodiment of the present invention will now be described with reference to FIGS. 3 to 5. FIG. 2 illustrates the configuration of a hydrogen-fueled internal combustion engine according to the present embodiment. The system according to the present embodiment includes an internal combustion engine 40. The internal combustion engine 40 communicates with an intake pipe 42 and an exhaust pipe 44.

The intake pipe 42 incorporates a throttle valve 46 for controlling the intake air amount. A hydrogen supply injector 48 is positioned downstream of the throttle valve 46. An intake port of the internal combustion engine 40 is provided with a gasoline supply injector 50. These injectors 48, 50 have the same configuration and function as the hydrogen supply injector 48 and gasoline supply injector 50 according to the first embodiment, respectively.

More specifically, the hydrogen supply injector 48 receives the supply of hydrogen-rich gas under a predetermined pressure as described later. The valve opens upon receipt of a drive signal that is supplied from the outside. A certain amount of hydrogen-rich gas, which varies with the valve opening timing, can be injected into the intake pipe 42. The gasoline supply injector 50 also receives the supply of gasoline under a predetermined pressure as described later. As the valve opens upon receipt of a drive signal that is supplied from the outside, a certain amount of gasoline, which varies with the valve opening timing, can be injected into the intake port.

The exhaust pipe 44 is provided with a dehydrogenation reactor 52. A hydrogenated gasoline injector 54 is mounted over the dehydrogenation reactor 52. These components respectively have substantially the same configuration as the dehydrogenation reactor 1 and hydrogenated gasoline injector 12 according to the first embodiment.

More specifically, the hydrogenated gasoline injector 54 receives the supply of hydrogenated gasoline under a predetermined pressure as described later. As the valve opens upon receipt of a drive signal that is supplied from the outside, a certain amount of hydrogenated gasoline, which varies with the valve opening timing, can be supplied to the interior of the dehydrogenation reactor 52. The dehydrogenation reactor 52 is capable of using exhaust heat that is radiated from the exhaust pipe 44, separating the hydrogenated gasoline, which is supplied as described above, into hydrogen-rich gas and dehydrogenated gasoline, and causing the hydrogen-rich gas and dehydrogenated gasoline to flow out of its bottom.

The exhaust pipe 44 incorporates an $O_2$ sensor 56 and a NOx sensor 58, which are positioned downstream of the dehydrogenation reactor 52. The $O_2$ sensor 56 checks for oxygen in the exhaust gas and generates an output according to the exhaust air-fuel ratio. The NOx sensor 58 generates an output according to the NOx concentration in the exhaust gas. A catalyst 60 for purifying the exhaust gas is positioned downstream of the above sensors 56, 58.

The system according to the present embodiment includes a hydrogenated gasoline tank 62. The hydrogenated gasoline tank 62 corresponds to the hydrogenated fuel storage section 3 according to the first embodiment, and stores hydrogenated gasoline, which contains a large amount of organic hydride as compared with regular gasoline. The organic hydride is an HC component that becomes dehydrogenated at a temperature of 300° C. or so. Concretely speaking, the organic hydride corresponds to decalin or cyclohexane as mentioned earlier.

Common high-octane gasoline contains approximately 40% toluene. When toluene is hydrogenated, methyl cyclohexane, which is an organic hydride, can be generated. In other words, when toluene, which is contained in regular gasoline, is hydrogenated, hydrogenated gasoline containing approximately 40% methyl cyclohexane can be generated. For the sake of convenience, the present embodiment assumes that the hydrogenated gasoline described above is supplied to the hydrogenated gasoline tank 62.

The hydrogenated gasoline tank 62 communicates with a hydrogenated gasoline supply pipe 64. A pump 66 is provided in the middle of the hydrogenated gasoline supply pipe 64. One end of the hydrogenated gasoline supply pipe 64 communicates with the hydrogenated gasoline injector 54. The hydrogenated gasoline in the hydrogenated gasoline tank 62 is drawn by the pump 66 and supplied to the hydrogenated gasoline injector 54 under a predetermined pressure during an internal combustion engine operation.

As described earlier, the hydrogenated gasoline injector 54 is mounted over the dehydrogenation reactor 52. The dehydrogenation reactor 52 uses exhaust heat to process hydrogenated gasoline. Therefore, the interior of the dehydrogenation reactor 52 heated to a temperature above 300° C. during an internal combustion engine operation.

To prevent the hydrogenated gasoline injector 54 from being directly exposed to the high internal temperature of the dehydrogenation reactor 52, the hydrogenated gasoline injector 54 is positioned so that its essential part projects into a space above the dehydrogenation reactor 52. In the system according to the present embodiment, therefore, the temperature of the hydrogenated gasoline injector 54 does not rise unduly.

Figure 3:
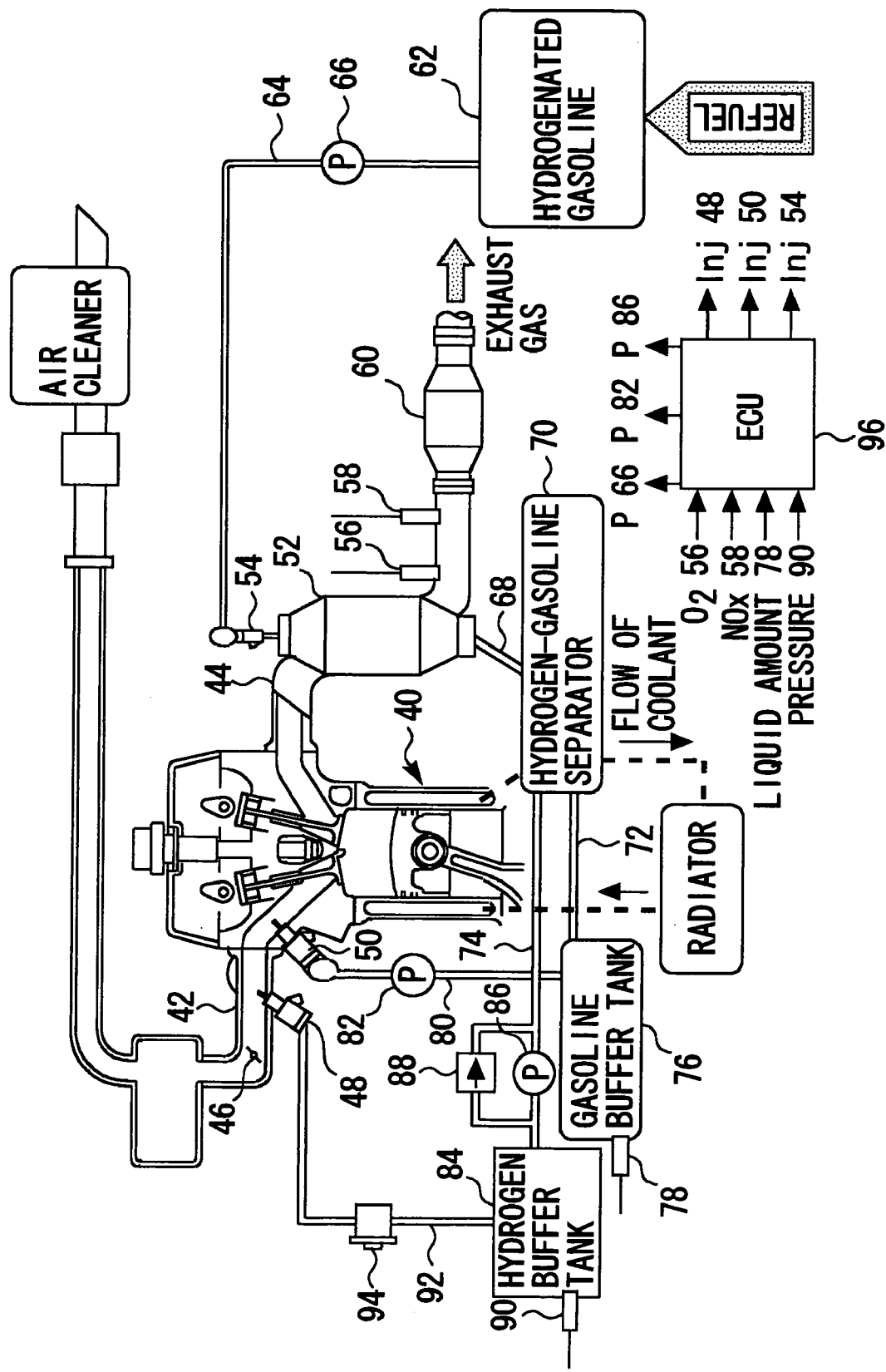
FIG. 3 illustrates the configuration of a second embodiment of the present invention.

The system shown in FIG. 3 assumes that the hydrogenated gasoline injector 54 is to be air-cooled. Alternatively, however, the hydrogenated gasoline injector 54 may be cooled in a different manner. For example, a cooling water path for introducing the cooling water for the internal combustion engine 40 to an area around the hydrogenated gasoline injector 54 may be furnished to water-cool the hydrogenated gasoline injector 54.

A reaction chamber is formed inside the dehydrogenation reactor 52. The fuel injected from the hydrogenated gasoline injector 54 is forwarded into the reaction chamber, separated into hydrogen-rich gas and dehydrogenated gasoline, and directed toward the bottom of the reaction chamber. The bottom of the reaction chamber communicates with a separator 70 via a pipe conduit 68.

As described earlier, the hydrogenated gasoline used in the present embodiment is obtained by turning the toluene, which is contained in regular gasoline, into an organic hydride. Therefore, if the hydrogenated gasoline is dehydrogenated, hydrogen-rich gas and regular gasoline are generated. It means that a mixture of hydrogen-rich gas and regular gasoline is supplied from the dehydrogenation reactor 52 to the separator 7.

The separator 70 has the same structure and function as the separator 2 according to the first embodiment. More specifically, the separator 70 is capable of cooling and separating high-temperature hydrogen-rich gas and dehydrogenated gasoline (regular gasoline) that are supplied from the dehydrogenation reactor 52. The separator 70 is water-cooled by circulating cooling water as is the case with the internal combustion engine 40. Therefore, the separator 70 can efficiently cool the hydrogen-rich gas and dehydrogenated gasoline.

The bottom of the separator 70 is provided with a liquid storage space for storing dehydrogenated gasoline, which is liquefied when cooled. Further, a gas storage space is provided above the liquid storage space in order to store the hydrogen-rich gas that remains in a gaseous state. The separator 70 communicates not only with a gasoline pipe conduit 72 for communicating with the liquid storage space, but also with a hydrogen pipe conduit 74 for communicating with the gas storage space.

The gasoline pipe conduit 72 communicates with a gasoline buffer tank 76. The gasoline buffer tank 76 corresponds to the dehydrogenated product storage section 4 according to the first embodiment. FIG. 3 illustrates a configuration in which the hydrogenated gasoline tank 62 and gasoline buffer tank 76 are positioned away from each other. However, the present embodiment is not limited to the use of such a configuration. More specifically, the hydrogenated gasoline tank 62 and gasoline buffer tank 76 may be contained in a single housing as is the case with the hydrogenated fuel storage section 3 and dehydrogenated product storage section 4 according to the first embodiment.

The gasoline buffer tank 76 is provided with a liquid level sensor 78. The liquid level sensor 78 generates an output in accordance with the level of the dehydrogenated gasoline stored in the gasoline buffer tank 76. Further, the gasoline buffer tank 76 communicates with a gasoline supply pipe 80. A pump 82 is installed in the middle of the gasoline supply pipe 80. The end of the gasoline supply pipe 80 communicates with the gasoline supply injector 50. The dehydrogenated gasoline in the gasoline buffer tank 76 is drawn by the pump 82 during an internal combustion engine operation and supplied to the gasoline supply injector 50 under a predetermined pressure.

The hydrogen pipe conduit 74 communicates with a hydrogen buffer tank 84. Further, the hydrogen pipe conduit 74 is provided with a pump 86 and a relief valve 88. The pump 86 force-feeds the hydrogen-rich gas in the separator 70 to the hydrogen buffer tank 84. The relief valve 88 prevents the discharge end pressure of the pump 86 from becoming excessive. The pump 86 and relief valve 88 make it possible to feed the hydrogen-rich gas to the hydrogen buffer tank 84 while keeping the internal pressure in the hydrogen buffer tank 84 from becoming excessive.

The hydrogen buffer tank 84 corresponds to the buffer tank 20 according to the first embodiment. In the present embodiment, however, the hydrogen buffer tank 84 is provided with a pressure sensor 90. The pressure sensor 90 generates an output in accordance with the internal pressure in the hydrogen buffer tank 84. The output generated from the pressure sensor 90 makes it possible to estimate the amount of hydrogen-rich gas stored in the hydrogen buffer tank 84.

The hydrogen buffer tank 84 communicates with a hydrogen supply pipe 92. A regulator is installed in the middle of the hydrogen supply pipe 92. The end of the hydrogen supply pipe 92 communicates with the hydrogen supply injector 48. When this configuration is employed, hydrogen-rich gas is supplied to the hydrogen supply injector 48 under the pressure adjusted by the regulator 94 as far as an adequate amount of hydrogen-rich gas is stored in the hydrogen buffer tank 84.

As shown in FIG. 3, the system according to the present embodiment includes an ECU 96. The ECU 96 is capable of controlling the system according to the present embodiment as is the case with the ECU 6 according to the first embodiment. More specifically, the outputs generated by various sensors including the aforementioned $O_2$ sensor 56, NOx sensor 58, liquid level sensor 78, and pressure sensor 90 are supplied to the ECU 96. Further, the ECU 96 is connected to various actuators such as the aforementioned pumps 66, 82, 86 and injectors 48, 50, 54. On the basis of the above sensor outputs, the ECU 96 performs a predetermined process to drive the above actuators properly.

[Overview of Operation Performed by Second Embodiment]

Figure 4:
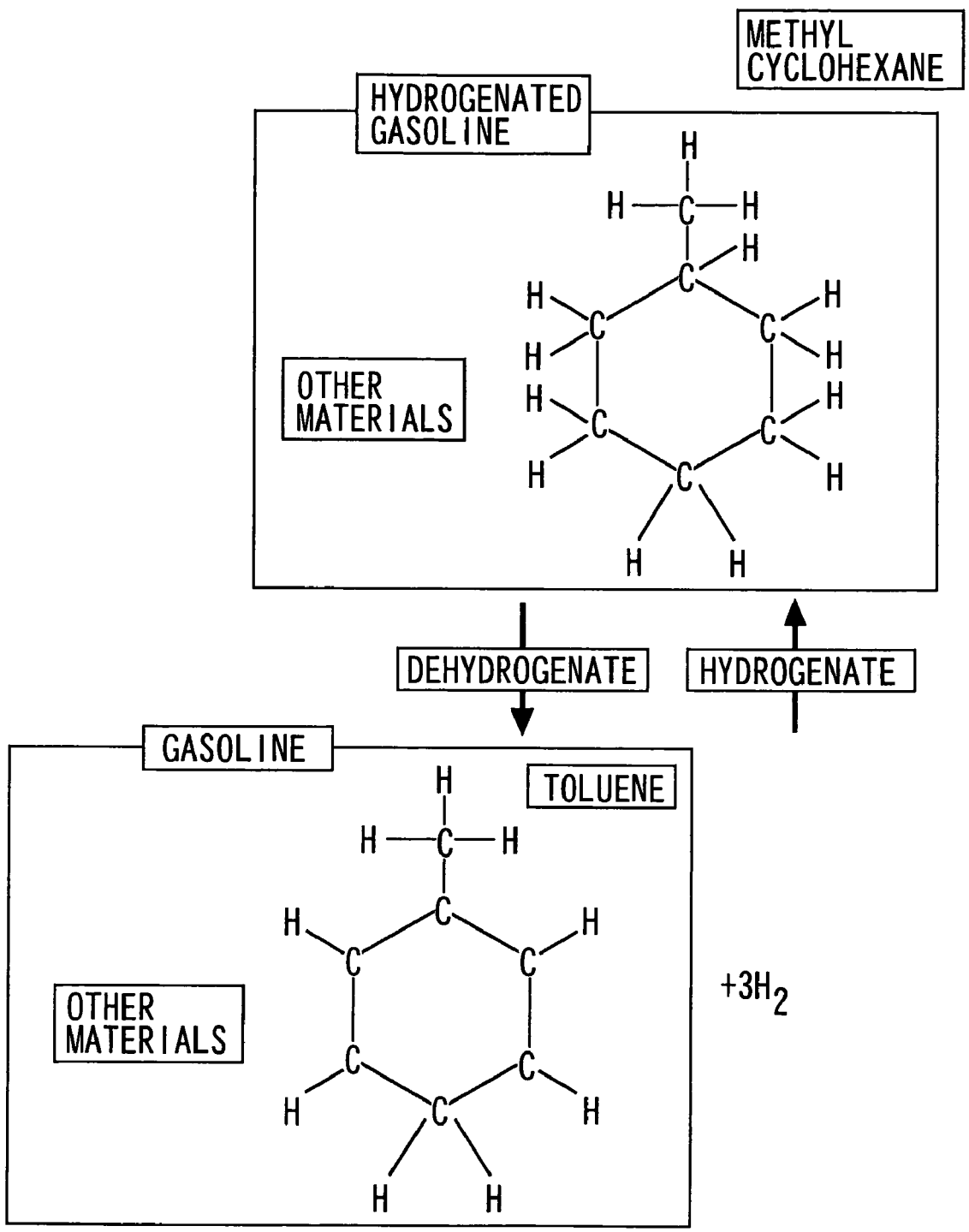
FIG. 4 illustrates a typical hydrogenation reaction and dehydrogenation reaction that occur between hydrogenated gasoline and dehydrogenated gasoline.

FIG. 4 illustrates fundamental reactions that occur between the hydrogenated gasoline and dehydrogenated gasoline used in the present embodiment. As mentioned earlier, the present embodiment uses hydrogenated gasoline containing approximately 40% methyl cyclohexane. When methyl cyclohexane ($C_7H_{14}$) is heated to a temperature of approximately 300° C., dehydrogenation occurs as indicated in the following formula to generate toluene ($C_7H_8$) and hydrogen ($H_2$).

$$C_7H_{14} \rightarrow C_7H_8 + 3H_2 \qquad (1)$$

If, on the contrary, toluene ($C_7H_8$) is hydrogenated, a reaction occurs as indicated in the following formula to generate methyl cyclohexane ($C_7H_{14}$).

$$C_7H_8 + 3H_2 \rightarrow C_7H_{14} \qquad (2)$$

When the hydrogenated gasoline injector 54 supplies hydrogenated gasoline to the dehydrogenation reactor 62 while the temperature of the exhaust pipe 44 is sufficiently high, the system according to the present embodiment can invoke dehydrogenation as indicated in (1) above. As a result, one mole of toluene ($C_7H_8$) and three moles of hydrogen ($H_2$) are generated from one mole of methyl cyclohexane ($C_7H_{14}$).

As described earlier, the system according to the present embodiment can supply dehydrogenated gasoline (regular gasoline) and hydrogen-rich gas to the internal combustion engine 40. When an appropriate amount of hydrogen is mixed with gasoline for combustion purposes, the combustion in a cylinder can be adequately stabilized in marked contrast to a case where no hydrogen is added. Consequently, the excess air percentage in the mixture gas can be greatly raised.

The amount of fuel consumption decreases with an increase in the excess air percentage in the mixture gas. It goes without saying that a decrease in the amount of fuel consumption improves exhaust emission. Therefore, when hydrogen is added to the mixture gas, the fuel efficiency characteristic and emission characteristic of the internal combustion engine 40 can be revolutionarily improved in marked contrast to a case where no hydrogen is added to the mixture gas.

To provide the above advantage by adding hydrogen to the mixture gas, it is necessary to add a certain amount of hydrogen. If, for instance, the hydrogen supplies approximately 20% of the heat quantity supplied by the gasoline, the fuel efficiency characteristic and emission characteristic can be effectively improved.

To let the hydrogen supply approximately 20% of the heat quantity supplied by the gasoline, however, 3.36 moles of hydrogen ($H_2$) is required per one mole of gasoline. If regular gasoline contains 40% toluene, 0.4 mole of methyl cyclohexane is contained in one mole of hydrogenated gasoline that is obtained by hydrogenating the gasoline. The amount of hydrogen ($H_2$) that can be generated from 0.4 mole of methyl cyclohexane is 1.2 moles.

More specifically, when one mole of hydrogenated gasoline is supplied to the dehydrogenation reactor 52, one mole of regular gasoline and 1.2 moles of hydrogen ($H_2$) are generated. When the generated one mole of regular gasoline is to be consumed on the assumption that 20% hydrogen is added, 3.36 moles of hydrogen ($H_2$) is required. Consequently, 2.16 moles (=3.36−1.2) of hydrogen ($H_2$) need to be added.

If the hydrogenated gasoline should contain methyl cyclohexane only, that is, it should contain 100% methyl cyclohexane, the amount of hydrogen that can be generated from one mole of hydrogenated gasoline is no more than 3 moles. In this case, too, according to the aforementioned hydrogen addition ratio, 0.36 mole (=3.36−3) of hydrogen ($H_2$) needs to be added. When hydrogenated gasoline is used as a raw material for generating hydrogen ($H_2$) and dehydrogenated gasoline and supplying both of them to the internal combustion engine 40 as described above, it is likely that the amount of hydrogen generation is insufficient in relation to the amount of dehydrogenated gasoline generation.

In the present embodiment, the amount of hydrogenated gasoline injection by the hydrogenated gasoline injector 54 is generally determined so that the dehydrogenation reactor 52 newly generates the hydrogen ($H_2$) to be consumed. In the system according to the present embodiment, therefore, the hydrogen will not generally be in short supply while the internal combustion engine 40 operates.

However, if an attempt is made to generate an adequate amount of hydrogen in a situation where the above tendency exists, an excessive amount of dehydrogenated gasoline is inevitably generated. In other words, if a process is continuously performed to dehydrogenate the hydrogenated gasoline in such a manner as to compensate for the consumed hydrogen ($H_2$) while an appropriate amount of hydrogen ($H_2$) is added to the mixture gas, the excessive portion of the dehydrogenated gasoline is stored so that the gasoline buffer tank 76 will be filled with the gasoline before long.

After the gasoline buffer tank 76 is filled with the dehydrogenated gasoline, an excessive amount of dehydrogenated gasoline can no longer be generated. When such a situation occurs, the system according to the present embodiment temporarily shuts off the hydrogen supply to the internal combustion engine 40, stops performing a new dehydrogenation process on the hydrogenated gasoline, and operates the internal combustion engine 40 by using only the dehydrogenated gasoline as the fuel for a certain period of time. When an appropriate space arises later in the gasoline buffer tank 76, the system resumes the process for dehydrogenating the hydrogenated gasoline and the process for adding hydrogen to the mixture gas.

[Details of Process Performed by Second Embodiment]

Figure 5:
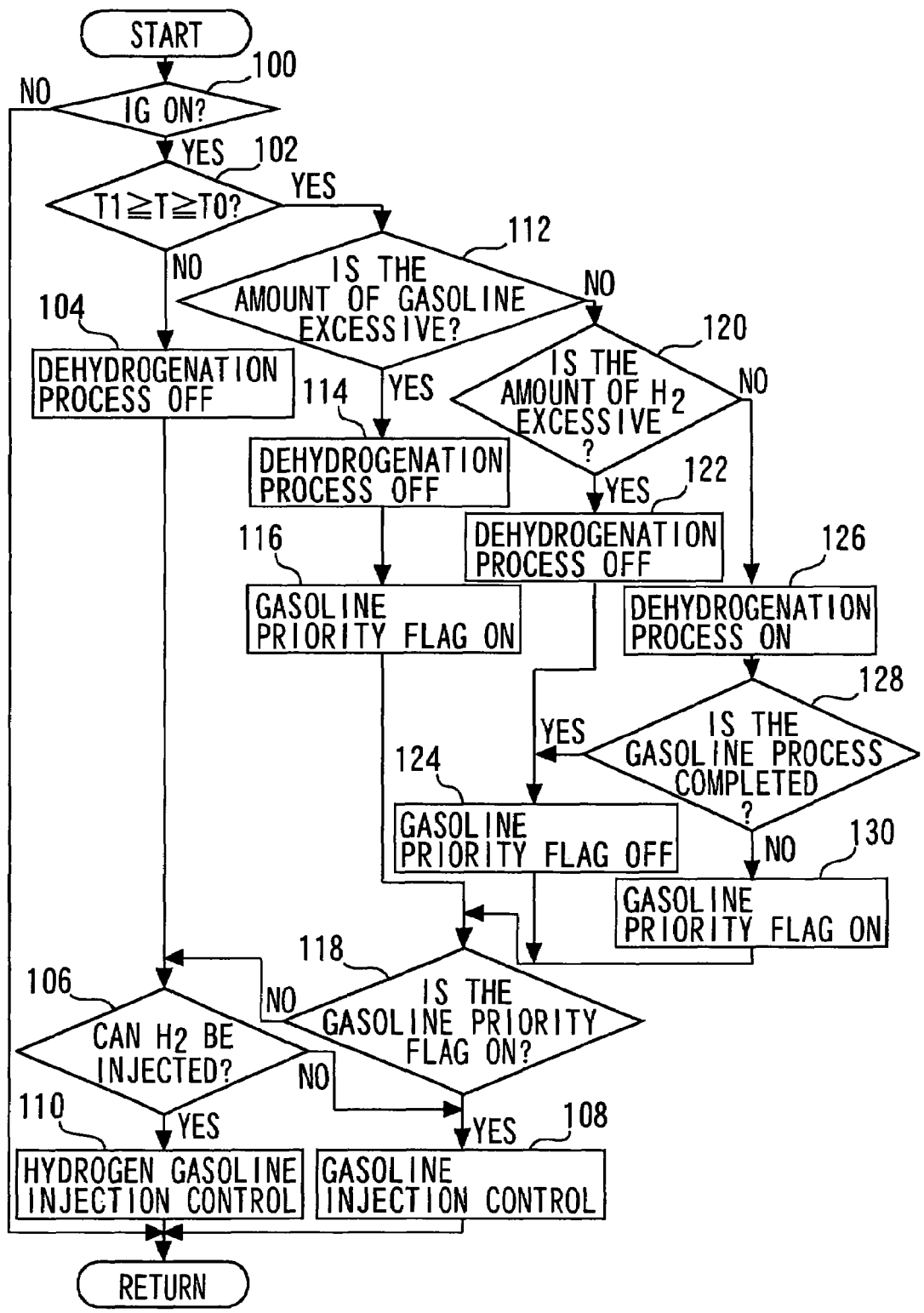
FIG. 5 is a flowchart illustrating a routine that is executed in the second embodiment of the present invention.

In a routine that is shown in FIG. 5, step 100 is first performed to judge whether the vehicle's ignition switch is ON. If the ignition switch is not ON, the routine immediately terminates.

If, on the other hand, the ignition switch is ON, step 102 is performed to judge whether the temperature T of the internal combustion engine 40 conforms to the dehydrogenation process execution condition, that is, judge whether $T1 \geq T \geq T0$. For the same reason as explained in conjunction with the first embodiment, the system according to the present embodiment allows the dehydrogenation reactor 52 to perform a dehydrogenation process only when the temperature T of the internal combustion engine 40 is not higher than 350° C. and not lower than 250° C. Step 102 is performed to judge whether the temperature T conforms to the above condition.

If the judgment result obtained in step 102 does not indicate that $T1 \geq T \geq T0$, it can be concluded that the condition for performing the dehydrogenation process is not established. In this instance, step 104 is performed to turn OFF the dehydrogenation process. Performing step 104 shuts off the drive signal supply to the hydrogenated gasoline injector 54 and inhibits the hydrogenated gasoline supply to the dehydrogenation reactor 52. As a result, new generation of hydrogen-rich gas and dehydrogenated gasoline is inhibited.

Next, step 106 is performed to judge whether hydrogen ($H_2$) can be injected. More specifically, this step is performed to judge whether the remaining amount of hydrogen ($H_2$), which is estimated in accordance with the output generated by the pressure sensor 90, is larger than a supply judgment amount. The "supply judgment amount" represents a remaining amount that is adequate for supplying hydrogen ($H_2$) to the hydrogen supply injector 48 via the regulator 94 under a steady pressure.

If the judgment result obtained in step 106 does not indicate that hydrogen ($H_2$) can be injected, it can be concluded that the internal combustion engine 40 needs to be operated by using dehydrogenated gasoline only, that is, regular gasoline only, as the fuel. In this instance, step 108 is performed to exercise gasoline injection control.

The ECU 96 stores a control rule for steadily operating the internal combustion engine 40 in a situation where only dehydrogenated gasoline is supplied as the fuel and a control rule for steadily operating the internal combustion engine 40 in a situation where dehydrogenated gasoline and hydrogen ($H_2$) are supplied as the fuel. When gasoline injection control is exercised, the fuel injection amount and other control parameters are determined with an operation command issued only to the gasoline supply injector 50 in compliance with the former rule. In other words, the internal combustion engine 40 is controlled on the assumption that only the dehydrogenated gasoline is supplied with the hydrogen supply injector 48 stopped. In this instance, the same operating state can be invoked in the internal combustion engine 40 as in a common internal combustion engine that does not use hydrogen.

As described earlier, the dehydrogenated gasoline used in the present embodiment has the same composition as regular gasoline. However, the regular gasoline contains a small amount of organic hydride. On the other hand, the dehydrogenated gasoline used in the present embodiment does not contain an organic hydride because it is dehydrogenated. In other words, the dehydrogenated gasoline used in the present embodiment has a higher octane rating than the regular gasoline. Strictly speaking, even when gasoline injection control is exercised as described above, the system according to the present embodiment can exhibit a better output characteristic than a common internal combustion engine.

If the judgment result obtained in step 106 of the routine shown in FIG. 5 indicates that hydrogen ($H_2$) can be injected, step 110 is performed to exercise hydrogen/gasoline injection control. When hydrogen/gasoline injection control is exercised, the ECU 96 computes the control parameters for the internal combustion engine 40 on the assumption that hydrogen ($H_2$) is to be added, and drives both the hydrogen supply injector 48 and gasoline supply injector 50 in accordance with the results of computation.

More specifically, step 110 is performed to apply a predetermined rule to the operating state of the internal combustion engine 40 and calculate the target amount of hydrogen-rich gas supply and the target amount of dehydrogenated gasoline supply. In accordance with the obtained calculation results, the hydrogen supply injector 48 and gasoline supply injector 50 are both controlled. When control is exercised in this manner, an appropriate amount of hydrogen ($H_2$) is added to the mixture gas so that the resulting fuel efficiency characteristic, output characteristic, and emission characteristic are remarkably superior to those exhibited when gasoline injection control is exercised.

If the judgment result obtained in step 102 of the routine shown in FIG. 5 indicates that $T1 \geq T \geq T0$ (where T is the temperature of the internal combustion engine 40), it can be concluded that the temperature condition for allowing the dehydrogenation reactor 52 to process the hydrogenated gasoline is established. In this instance, step 112 is performed to judge whether the amount of gasoline in the gasoline buffer tank 76 is excessive. More specifically, step 112 is performed to judge whether the upper-limit storage amount of the gasoline buffer tank 76 is reached by the amount of dehydrogenated gasoline, which is estimated in accordance with the output generated by the liquid level sensor 78.

As described earlier, when hydrogen ($H_2$) and dehydrogenated gasoline are both supplied to the internal combustion engine 40, it is likely that the system according to the present embodiment will generate an excessive amount of dehydrogenated gasoline, thereby gradually increasing the amount of storage in the gasoline buffer tank 76. If the judgment result obtained in step 112 indicates that the amount of gasoline is excessive, it can be concluded that the amount of stored dehydrogenated gasoline can no longer be increased. In this instance, step 114 is performed to turn OFF the dehydrogenation process.

When the dehydrogenation process is turned OFF, the new hydrogenated gasoline supply to the dehydrogenation reactor 52 is inhibited with the new generation of dehydrogenated gasoline and hydrogen-rich gas stopped. Therefore, when the above process is performed, it is possible to properly avoid an increase in the amount of dehydrogenated gasoline in the gasoline buffer tank 76.

Next, step 116 is performed to turn ON a gasoline priority flag. While an excessive amount of gasoline is stored in the gasoline buffer tank 76, it is preferred that the consumption of dehydrogenated gasoline be promoted. In such a situation, the gasoline priority flag turns ON. When the gasoline priority flag is ON, the ECU 96 stops adding hydrogen ($H_2$) to the mixture gas and recognizes that the dehydrogenated gasoline should be used on a preferential basis.

After completion of step 116 of the routine shown in FIG. 5, step 118 is performed to judge whether the gasoline priority flag is ON. If the obtained judgment result does not indicate that the gasoline priority flag is ON, it can be concluded that priority need not always be given to the consumption of dehydrogenated gasoline. In this instance, steps 106 and beyond are performed. Gasoline injection control or hydrogen/gasoline injection control is exercised depending on whether hydrogen ($H_2$) can be supplied.

If, on the other hand, the judgment result obtained in step 118 indicates that the gasoline priority flag is ON, it can be concluded that it is necessary to shut off the supply of hydrogen ($H_2$) and promote the consumption of dehydrogenated gasoline. In this instance, step 108 is unconditionally performed to exercise gasoline injection control.

If the query in step 112 of the routine shown in Fig. 5 is answered "No," it can be concluded that the gasoline buffer tank 76 has a space for accepting an additional inflow of dehydrogenated gasoline. In this instance, step 120 is performed to judge whether the amount of hydrogen-rich gas in the hydrogen buffer tank 84 is excessive. More specifically, step 120 is performed to judge whether the upper-limit storage amount of the hydrogen buffer tank 76 is reached by the amount of hydrogen-rich gas, which is estimated in accordance with the output generated by the pressure sensor 90.

As a general rule, the system according to the present embodiment performs a dehydrogenation process in such a manner as to compensate for the amount of hydrogen consumption. Therefore, the amount of hydrogen-rich gas in the hydrogen buffer tank 84 does not become excessive while a normal operation is conducted. However, if the amount of stored hydrogen-rich gas becomes excessive for some reason or other, it is necessary to stop the generation of new hydrogen-rich gas. Therefore, if the judgment result obtained in step 120 indicates that the amount of stored hydrogen ($H_2$) is excessive, step 122 is performed to turn OFF the dehydrogenation process.

In the above situation, the consumption of the hydrogen-rich gas stored in the hydrogen buffer tank 84 should be promoted. Therefore, step 124 is performed to turn OFF the gasoline priority flag. In this instance, the judgment result obtained in the next step (step 118) does not indicate that the gasoline priority flag is ON. Further, the judgment result obtained in the next step (step 106) indicates that hydrogen ($H_2$) can be injected. Therefore, hydrogen/gasoline injection control is exercised. As a result, the hydrogen-rich gas is no longer stored to excess.

If the query in step 120 of the routine shown in FIG. 5 is answered "No," it can be concluded that the condition for performing a dehydrogenation process is established. In this instance, step 126 is performed to turn ON the dehydrogenation process. When the dehydrogenation process is turned ON, a drive signal is supplied to the hydrogenated gasoline injector 54 so that an appropriate amount of hydrogenated gasoline is supplied to the dehydrogenation reactor 52. As a result, hydrogen-rich gas is newly generated as needed to compensate for the amount of hydrogen-rich gas that is consumed as the fuel in the internal combustion engine 40. In addition, dehydrogenated gasoline is newly generated in accordance with the amount of hydrogen-rich gas generation.

Next, step 128 is performed to judge whether the dehydrogenated gasoline in the gasoline buffer tank 76 is completely processed. If the judgment result obtained in step 112 indicates that the amount of gasoline in the gasoline buffer tank 76 is excessive, the ECU 96 concludes that the dehydrogenated gasoline process is not completed until the amount of stored gasoline is smaller than a process completion judgment value. If such a conclusion is reached, step 130 is performed to turn ON the gasoline priority flag. In this instance, step 108 is subsequently performed to exercise gasoline injection control. Therefore, a preferential process is continuously performed for the dehydrogenated gasoline.

When the amount of gasoline in the gasoline buffer tank 76 is smaller than the aforementioned process completion judgment value, the ECU 96 concludes that the dehydrogenated gasoline process is completed in step 128. In this instance, step 124 is performed to turn OFF the gasoline priority flag. Thus, the resulting state is for choosing between the two control modes depending on whether hydrogen can be injected.

As described above, the routine shown in FIG. 5 makes it possible to choose between an operation mode for using only dehydrogenated gasoline as the fuel and another operation mode for using both hydrogen and dehydrogenated gasoline as the fuel depending on the status of the internal combustion engine 40 and the storage status of hydrogen-rich gas and dehydrogenated gasoline. When these operation modes are selectively used, it is possible to properly maintain the output characteristic, fuel efficiency characteristic, and emission characteristic of the internal combustion engine 40 while using two different types of fuel and without being affected by an unbalance between the consumption amounts of the two different types of fuel.

In other words, the system according to the present embodiment requires the supply of a single fuel (hydrogenated gasoline), but uses two different types of fuel (hydrogen-rich gas and dehydrogenated fuel) to produce a beneficial effect. Further, the system according to the present embodiment enables the vehicle to correct any unbalance between the consumption amounts of the two different types of fuel. Consequently, the two different types of fuel can be continuously used without performing any complicated maintenance task and without imposing a limit for adjusting the consumption amounts of the two different types of fuel.

Since the system according to the present embodiment has the aforementioned characteristics, it can be handled with ease as is the case with an ordinary internal combustion engine. Further, the fuel efficiency characteristic, output characteristic, and emission characteristic of the system according to the present embodiment are extremely superior to those of an ordinary internal combustion engine.

In the second embodiment, which has been described above, the organic hydride contained in the hydrogenated gasoline is limited to methyl cyclohexane for explanation purposes. However, the hydrogenated gasoline applicable to the second embodiment is not limited to methyl cyclohexane. More specifically, the organic hydride contained in the hydrogenated gasoline may be any substance that invokes dehydrogenation at a temperature of approximately 300° C. It may be acyclic or cyclic hydrocarbon or acyclic or cyclic oxygenated hydrocarbon. For example, it may be n-hexane, iso-octane, or other acyclic hydrocarbon, cyclohexane, decalin, or other similar cyclic compound, cyclohexanol, cyclohexane methanol, or other similar alcohol, or methyl-t-butyl ether or other similar ether.

The second embodiment, which has been described above, does not use a mode for injecting only the hydrogen-rich gas into the internal combustion engine 40. However, the present invention is not limited to such mode setup. For example, an operation mode for supplying only the hydrogen-rich gas to the internal combustion engine 40 may be used at the time, for instance, of internal combustion engine startup.

The second embodiment, which has been described above, includes not only the separator 70 but also the gasoline buffer tank 76 for storing dehydrogenated gasoline. However, the present invention is not limited to the use of such a configuration. More specifically, the gasoline buffer tank 76 may be omitted if there is an adequate internal liquid storage space in the separator 70.

Figure 6:
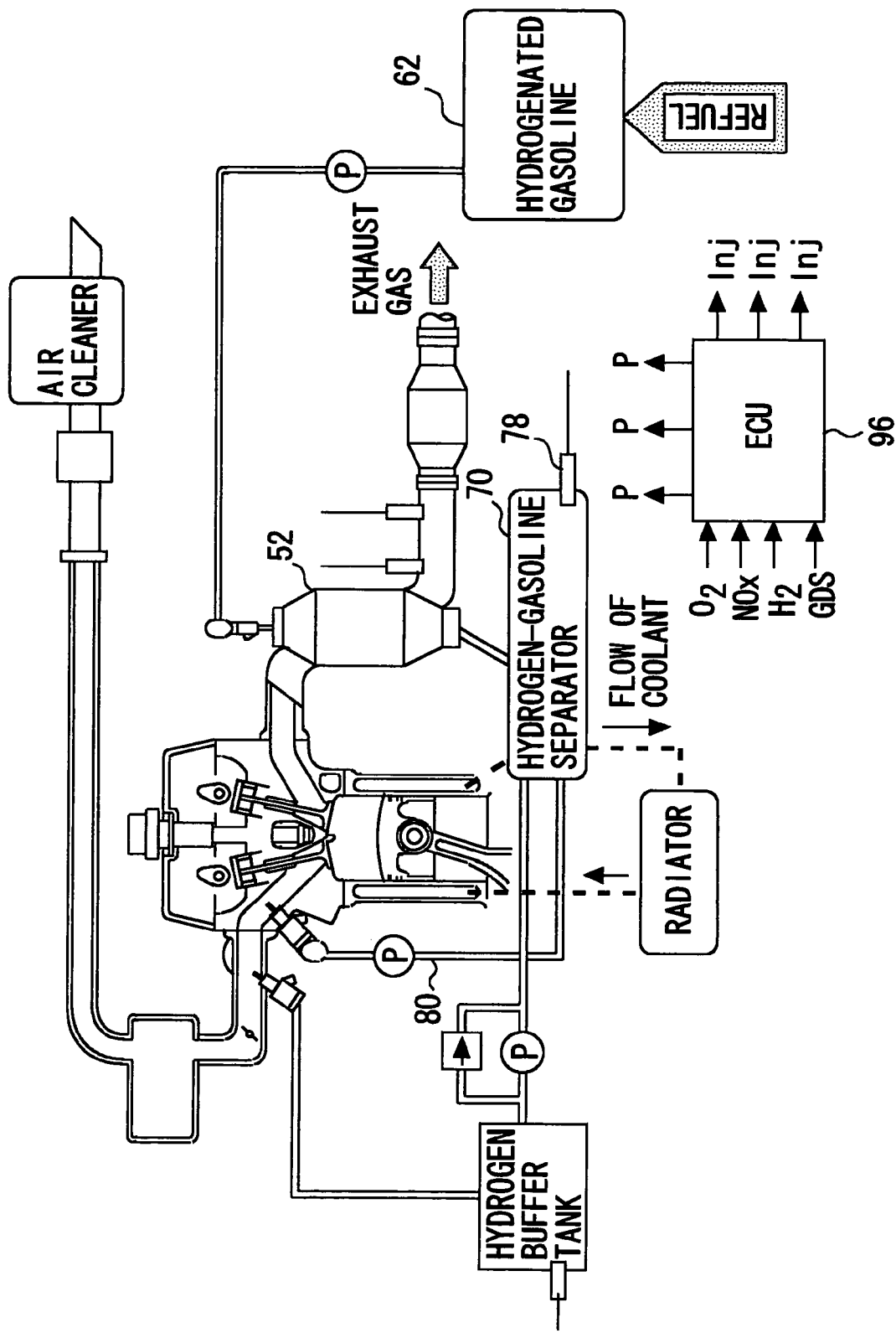
FIG. 6 illustrates the configuration of a modified version of the second embodiment of the present invention.

FIG. 6 illustrates the configuration of the above-mentioned modified embodiment. The gasoline buffer tank 76 is excluded from the configuration shown in FIG. 6. The illustrated configuration is similar to the configuration shown in FIG. 3 except that the gasoline supply pipe 80 is directly connected to the separator 70 and that the separator 70 incorporates the liquid level sensor 78 for detecting the amount of stored dehydrogenated gasoline. When this configuration is employed, the system can be reduced in size because the gasoline buffer tank 76 is not included.

The features and advantages of the present invention are summarized below.

According to a first aspect of the present invention, there is provided a hydrogen-fueled internal combustion engine that operates upon receipt of one or two or more types of fuel that are selected from hydrogenated fuel, a dehydrogenated product and hydrogen, which dehydrogenated product and hydrogen are obtained by dehydrogenating the hydrogenated fuel, the hydrogen-fueled internal combustion engine comprising: a hydrogenated fuel storage section; reaction means that includes a catalyst that is positioned to be heatable and dehydrogenates hydrogenated fuel, which is supplied from the hydrogenated fuel storage section, on the catalyst that is heated; separation means for separating hydrogen-rich gas and a dehydrogenated product that are derived from dehydrogenation; and a dehydrogenated product storage section for storing the separated dehydrogenated product.

According to a second aspect of the present invention, there is provided the hydrogen-fueled internal combustion engine as described in the first aspect, the hydrogen-fueled internal combustion engine further comprising fuel supply means for arbitrarily selecting one or more types of fuel from among the hydrogenated fuel stored in the hydrogenated fuel storage section, the hydrogen-rich gas separated by the separation means, and the dehydrogenated product stored in the dehydrogenated product storage section, and supplying the selected types of fuel to the internal combustion engine.

According to a third aspect of the present invention, there is provided the hydrogen-fueled internal combustion engine as described in the first or second aspect, wherein a honeycomb carrier is used as a catalyst carrier.

According to a fourth aspect of the present invention, there is provided the hydrogen-fueled internal combustion engine as described in the third aspect, wherein the honeycomb carrier has 45 to 310 cells/$cm_2$ and functions as a catalyst carrier whose ratio between the organic hydride inlet diameter and depth (diameter/depth) ranges from 0.1 to 0.5.

According to a fifth aspect of the present invention, there is provided the hydrogen-fueled internal combustion engine as described in the first, second, third, or fourth aspect, wherein the hydrogenated fuel storage section and the dehydrogenated product storage section are both made of an elastic resin material.

<Hydrogenated Fuel>

The hydrogen-fueled internal combustion engine according to one of the first to fifth aspects of the present invention uses hydrogenated fuel.

In the first to fifth aspects of the present invention, the hydrogenated fuel is a mixture of one or two or more types of fuel, which are selected from an organic hydride and a fuel obtained by adding hydrogen to light oil, gasoline, or other similar internal combustion engine fuel.

The organic hydride is a fuel containing saturated hydrocarbon that can generate hydrogen when dehydrogenated. It corresponds to acyclic or cyclic hydrocarbon or acyclic or cyclic oxygenated hydrocarbon. For example, the acyclic hydrocarbon may be n-hexane or iso-octane. The cyclic hydrocarbon may be, for instance, cyclohexane, methyl cyclohexane, or other similar monocyclic compound or decalin or other similar bicyclic compound. The oxygenated hydrocarbon may be cyclohexanol, cyclohexane methanol, or other similar alcohol or methyl-t-butyl ether or other similar ether.

The dehydrogenated product, which is obtained by dehydrogenating the hydrogenated fuel, is a reaction product that is obtained when the organic hydride is dehydrogenated to discharge hydrogen. In the case, for instance, of cyclohexane, the dehydrogenated product corresponds to benzene, which is mainly generated together with hydrogen.

When the organic hydride is dehydrogenated, a cyclic unsaturated product having an unsaturated linkage is generated together with hydrogen-rich gas as a reaction product due to hydrogen discharge. If, for instance, a fuel made of cyclohexane or a fuel mainly made of cyclohexane is employed, cyclohexane is dehydrogenated so that benzene is generated together with hydrogen-rich gas as a cyclic unsaturated product.

Meanwhile, the hydrogenated fuel can be generated in a petroleum refining process by performing a reforming or blending process on a distillate containing a large amount of organic hydride. The hydrogenated fuel can also be generated by adding hydrogen to light oil, gasoline, or other similar internal combustion engine fuel because it contains cyclic or acyclic unsaturated hydrocarbon.

Although the hydrogen addition method is not specifically defined, a method for allowing an unsaturated substance to react with hydrogen-rich gas on a heated catalyst may be used (refer, for instance, to Japanese Patent Laid-Open No. 255503/2000).

When hydrogen is added to benzene, which is a cyclic unsaturated substance, for hydrogenation purposes, cyclohexane, which is hydrogenated benzene, is generated (reproduced).

The hydrogenated fuel is supplied to the hydrogenated fuel storage section. The hydrogenated fuel storage section may be a tank dedicated to the hydrogenated fuel or a shared tank for both the hydrogenated fuel and the below-described dehydrogenated product obtained upon hydrogen separation.

In the first to fifth aspects of the present invention, the hydrogenated fuel storage section can supply the hydrogenated fuel directly to the internal combustion engine. Further, the hydrogenated fuel can be directly used as the fuel for the internal combustion engine.

<Reaction Means>

Meanwhile, the hydrogenated fuel can be directed to the reaction means, which includes a catalyst that is positioned to be heatable and invokes dehydrogenation on the catalyst.

It is preferred that the reaction means include, but not limited to, a fuel supply device for supplying the hydrogenated fuel to the catalyst with a metallic catalyst layer provided in each cell of the heatable honeycomb carrier.

The honeycomb carrier may be made, for instance, of stainless steel or other metal, ceramic, or carbon. It is preferred that the honeycomb carrier have 45 to 310 cells/cm$^2$ and function as a catalyst carrier whose ratio between the hydrogenated fuel inlet diameter and depth (diameter/depth) ranges from 0.1 to 0.5. The cross section of a cell is not specifically defined, but may be rectangular, hexagonal, or triangular.

The metallic catalyst layer contains one or two or more types of salt or complex that are selected from among platinum, palladium, rhodium, rhenium, ruthenium, nickel, and the like. It is preferred that a coat layer be provided between the catalyst ad honeycomb carrier. The coat layer can be made by selecting one or two or more types from among alumina, ceria, zirconia, carbon, zeolite, sepiolite, mordenite, and the like, mixing the selection with a binder (hydroxide salt or oxide salt of a metal element constituting alumina or the like) and water, and applying a coat of the resulting mixture.

The amount of metallic catalyst use may be determined as appropriate. However, it is preferred that the amount of metallic catalyst use be 1 to 20 g per liter of honeycomb carrier.

The means for heating the catalyst is not specifically defined. The heat generated by the internal combustion engine or the heat of the exhaust gas may be used to heat the catalyst. An alternative is to use an independent heating means. From the viewpoint of effective energy use, however, it is preferred that the heat of the exhaust gas discharged from the internal combustion engine be used.

If, for instance, the catalyst is formed around the exhaust pipe that discharges the exhaust gas, the catalyst is heated by the exhaust heat that propagates through the exhaust pipe. Thus, the exhaust heat or the waste heat of the internal combustion engine, that is, the thermal energy, can be effectively used. The exhaust gas discharged from a gasoline engine or other similar internal combustion engine generally reaches a temperature of 400° C. or higher. Therefore, when the exhaust heat is used, the catalyst temperature, which contributes toward dehydrogenation, can be steadily maintained at a level of 250° C. or higher, which is required for dehydrogenation. As a result, there is no need to furnish a separate heat source and the apparatus can be reduced in size and weight. In addition, the energy use efficiency in the internal combustion system can be raised. Further, since there is no exhaust resistance within the exhaust pipe, the internal combustion engine performance does not deteriorate. In general, the exhaust pipe exhibits high thermal conductivity because it is made of metal. Therefore, the exhaust pipe can effectively transmit the exhaust heat of the exhaust gas to the catalyst.

The fuel supply device is positioned so as to supply the hydrogenated fuel to the catalyst. It can be configured so that a wide-angle spray of hydrogenated fuel can be applied to the cell entries. For example, an injector (injection device) is suitable as the fuel supply device. When a control driver is connected to the injector, the injection amount can be controlled as appropriate on an individual supply device basis. Further, a plurality of fuel supply devices can be furnished for a single reaction means so that the hydrogenated fuel is preferably supplied with a liquid film of hydrogenated fuel formed on the catalyst.

The reaction means may further be equipped with a flow path that communicates with the reaction means and allows a mixture gas, which is derived from dehydrogenation in the reaction means, to pass through. This flow path is positioned along the exhaust pipe. This ensures that the mixture gas (hydrogen-rich gas) containing the hydrogen-rich gas and dehydrogenated product generated by the reaction means can easily pass through the pipe while its high temperature is maintained, that is, while the dehydrogenated product is kept in a gaseous state.

The exhaust pipe for discharging the exhaust gas from the internal combustion engine can generally be made of a single pipe. However, the single pipe may branch off to a plurality of pipes. In such an instance, each exhaust pipe branch may be provided with the reaction means. In other words, the vehicle may be provided with a plurality of reaction means. As a result, it is possible to increase the amount of hydrogen that can be supplied.

<Separation Means>

The separation means separates hydrogen-rich gas from a gas mixture of hydrogen-rich gas and dehydrogenated product, which are generated when the hydrogenated fuel is dehydrogenated in the reaction means.

For example, the separation means may use a method for cooling the gas mixture by means, for instance, of heat exchange or adiabatic expansion, and separating the dehydrogenated product from the gas mixture by gravity or centrifugal force, a method for separating the gas mixture with a hydrogen permeable film such as a polymer or Pd thin film, or a method for aerating activated carbon or other organic matter adsorbent with the gas mixture to separate the dehydrogenated product from the gas mixture.

<Dehydrogenated Product>

Dehydrogenated product separated from the hydrogen-rich gas is stored in the dehydrogenated product storage section.

It is preferred that the dehydrogenated product storage section be not an independent tank but a multi-chamber storage tank that includes a hydrogenated liquid storage section for storing the hydrogenated fuel. In this instance, it is preferred that the hydrogenated fuel storage section and the dehydrogenated product storage section from which the hydrogen-rich is separated be both made of an elastic resin material. Then, the use of a single integrated tank is permissible so that installation can be achieved in a vehicle or other limited space. In addition, the weight can be reduced. Further, since the dehydrogenated product from which the hydrogen-rich gas is removed is stored, there is no need to furnish an exhaust port for discharging the hydrogen-rich gas.

When fed into the internal combustion engine, the dehydrogenated product can be used as the fuel as is the case with gasoline or other conventional fuel. Further, the dehydrogenated product can be recovered, hydrogenated, and used as the hydrogenated fuel.

<Hydrogen-rich Gas>

The hydrogen-rich gas separated by the separation means can be supplied to the internal combustion engine. It can also be supplied to the internal combustion engine together with the hydrogenated fuel or dehydrogenated product. Therefore, hydrogen supply means for supplying to at least one of the intake system, combustion chamber, and exhaust system of the internal combustion engine can be furnished. An appropriate hydrogen supply means can be selected as needed. For example, an injector (injection device) is suitable as the hydrogen supply means.

In accomplishing the above objects, according to a sixth aspect of the present invention, there is provided a hydrogen-fueled internal combustion engine comprising: a hydrogenated gasoline tank for storing hydrogenated gasoline containing an organic hydride; fuel separation means for separating the hydrogenated gasoline into hydrogen-rich gas and dehydrogenated gasoline; and fuel supply means for supplying at least the hydrogen-rich gas and/or the dehydrogenated gasoline on an individual basis or simultaneously, among the hydrogenated gasoline, the hydrogen-rich gas, and the dehydrogenated gasoline, to the internal combustion engine as fuel.

According to a seventh aspect of the present invention, there is provided the hydrogen-fueled internal combustion engine as described in the sixth aspect, wherein the fuel supply means comprises: hydrogenated gasoline supply means for supplying the hydrogenated gasoline to the internal combustion engine; hydrogen-rich gas supply means for supplying the hydrogen-rich gas to the internal combustion engine; dehydrogenated gasoline supply means for supplying the dehydrogenated gasoline to the internal combustion engine; fuel selection means for selecting one or more types of fuel from the hydrogenated gasoline, the hydrogen-rich gas, and the dehydrogenated gasoline; and fuel supply control means for controlling the hydrogenated gasoline supply means, the hydrogen-rich gas supply means, and the dehydrogenated gasoline supply means so that the selected types of fuel are supplied to the internal combustion engine.

According to an eighth aspect of the present invention, there is provided the hydrogen-fueled internal combustion engine as described in the seventh aspect, the hydrogen-fueled internal combustion engine further comprising: gasoline necessity judgment means for judging whether the supply of gasoline is necessary; and dehydrogenated gasoline supply judgment means for judging whether the dehydrogenated gasoline can be supplied, wherein the fuel supply control means allows the hydrogenated gasoline to be supplied to the internal combustion engine only when the necessity for gasoline supply is recognized and the dehydrogenated gasoline cannot be supplied.

According to a ninth aspect of the present invention, there is provided the hydrogen-fueled internal combustion engine as described in the eighth aspect, the hydrogen-fueled internal combustion engine further comprising hydrogen-rich gas supply judgment means for judging whether the hydrogen-rich gas can be supplied, wherein, when the hydrogen-rich gas and the dehydrogenated gasoline can both be supplied, the fuel supply control means constantly supplies a combination of the hydrogen-rich gas and the dehydrogenated gasoline to the internal combustion engine as fuel.

According to a tenth aspect of the present invention, there is provided the hydrogen-fueled internal combustion engine as described in the sixth aspect, wherein the fuel supply means comprises: hydrogen-rich gas supply means for supplying the hydrogen-rich gas to the internal combustion engine; dehydrogenated gasoline supply means for supplying the dehydrogenated gasoline to the internal combustion engine; fuel selection means for selecting one or more types of fuel from the hydrogen-rich gas and the dehydrogenated gasoline; and fuel supply control means for controlling the hydrogen-rich gas supply means and the dehydrogenated gasoline supply means so that the selected types of fuel are supplied to the internal combustion engine.

According to an eleventh aspect of the present invention, there is provided the hydrogen-fueled internal combustion engine as described in the tenth aspect, the hydrogen-fueled internal combustion engine further comprising: a hydrogen-rich gas tank for storing the hydrogen-rich gas; and hydrogen-rich gas remaining amount judgment means for judging whether a permissible supply amount is exceeded by the remaining amount of hydrogen-rich gas, wherein the fuel supply control means includes fuel supply amount calculation means for calculating the dehydrogenated gasoline supply amount on the assumption that only the dehydrogenated gasoline is supplied to the internal combustion engine, and, when the permissible supply amount is not exceeded by the remaining amount of hydrogen-rich gas, supplies only the dehydrogenated gasoline to the internal combustion engine in accordance with a fuel supply amount that is calculated by the fuel supply amount calculation means.

According to a twelfth aspect of the present invention, there is provided the hydrogen-fueled internal combustion engine as described in the tenth or eleventh aspect, the hydrogen-fueled internal combustion engine further comprising: a dehydrogenated gasoline tank for storing the dehydrogenated gasoline; and dehydrogenated gasoline remaining amount judgment means for judging whether an upper-limit storage amount is reached by the remaining amount of dehydrogenated gasoline, wherein the fuel separation means performs a process for separating the hydrogenated gasoline into the hydrogen-rich gas and the dehydrogenated gasoline in such a manner as to compensate for the amount of hydrogen-rich gas consumption; and wherein the fuel supply control means supplies only the dehydrogenated gasoline to the internal combustion engine in a situation where the upper-limit storage amount is reached by the remaining amount of dehydrogenated gasoline.

The hydrogen-fueled internal combustion engine according to one of the first to fifth aspects of the present invention can freely select one or two or more types of fuel from among the hydrogenated fuel, the dehydrogenated product and hydrogen, which dehydrogenated product and hydrogen are obtained by dehydrogenating the hydrogenated fuel, and supply the selected types of fuel to the internal combustion engine. Hydrogen that is obtained by dehydrogenating the hydrogenated fuel can be supplied to the intake system, exhaust system, and combustion chamber of an internal combustion engine without furnishing a high-pressure tank or liquid hydrogen tank and without adsorbing or occluding hydrogen or reforming the fuel. Therefore, the present invention makes it possible to increase the energy use efficiency, reduce the apparatus in size and weight, and construct a clean system.

According to the sixth aspect of the present invention, the hydrogenated gasoline, hydrogen-rich gas, and dehydrogenated gasoline are made available as the fuel for the vehicle simply by supplying hydrogenated gasoline containing an organic hydride to the vehicle. According to the present invention, the internal combustion engine can be properly operated when at least the hydrogen-rich gas and dehydrogenated gasoline are used as the fuel.

According to the seventh aspect of the present invention, an arbitrary fuel can be selected from among hydrogenated gasoline, hydrogen-rich gas, and dehydrogenated gasoline and supplied to the internal combustion engine as needed. Therefore, the present invention provides a high degree of freedom in selecting the type of fuel to be used, and can properly handle various situations.

According to the eighth aspect of the present invention, dehydrogenated gasoline can be supplied wherever possible when the supply of gasoline is demanded. The dehydrogenated gasoline has a high octane rating. Therefore, the present invention can enhance the antiknock characteristic of the internal combustion engine.

When the hydrogen-rich gas and dehydrogenated gasoline can both be supplied, the ninth aspect of the present invention can constantly supply a combination of the hydrogen-rich gas and dehydrogenated gasoline to the internal combustion engine as fuel. This fuel combination provides an excellent fuel efficiency characteristic and an excellent emission characteristic while exhibiting high antiknock qualities.

According to the tenth aspect of the present invention, hydrogenated gasoline can be used as the raw material for supplying hydrogen-rich gas and dehydrogenated gasoline to the internal combustion engine. Therefore, the present invention provides high antiknock qualities, an excellent fuel efficiency characteristic, and an excellent emission characteristic while providing increased ease of fuel handling.

The eleventh aspect of the present invention monitors the remaining amount of hydrogen-rich gas. While the hydrogen-rich gas cannot be supplied, the eleventh aspect of the present invention can assure a stable operation by supplying only the dehydrogenated gasoline to the internal combustion engine.

According to the twelfth aspect of the present invention, the hydrogenated gasoline can be separated into hydrogen-rich gas and dehydrogenated gasoline in such a manner as to compensate for the amount of hydrogen-rich gas consumption. If, as a result, the amount of dehydrogenated gasoline becomes excessive so that the remaining amount of dehydrogenated gasoline reaches the upper-limit storage amount, it is possible to avoid excessive generation of dehydrogenated gasoline by shutting off the hydrogen supply to the internal combustion engine and supplying only the dehydrogenated gasoline.

In the first embodiment, which has been described above, the dehydrogenation reactor 1 corresponds to the "reaction means" according to the first aspect of the present invention, and the separator 2 corresponds to the "separation means" according to the first aspect of the present invention. Further, valves V1 and V2, pumps P1 and P4, supply piping 23, piping 17, hydrogen supply injector 18, gasoline supply injector 19, and buffer tank 20 correspond to the "fuel supply means" according to the second aspect of the present invention.

Further, in the first embodiment, which has been described above, the hydrogenated fuel storage section 4 corresponds to the "hydrogenated gasoline tank" according to the sixth aspect of the present invention; the dehydrogenation reactor 1 and separator 2 correspond to the "fuel separation means" according to the sixth aspect of the present invention; valves V1 and V2, pumps P1 and P4, supply piping 23, piping 17, hydrogen supply injector 18, gasoline supply injector 19, and buffer tank 20 correspond to the "fuel supply means" according to the sixth aspect of the present invention.

Furthermore, in the first embodiment, which has been described above, valves V1 and V2, pump P1, supply piping 23, and gasoline supply injector 19 correspond to the "hydrogenated gasoline supply means" and "dehydrogenated gasoline supply means" according to the seventh aspect of the present invention, and pump P4, piping 17, hydrogen supply injector 18, and buffer tank 20 correspond to the "hydrogen-rich gas supply means" according to the seventh aspect of the present invention. The "fuel selection means" according to the seventh aspect of the present invention is implemented when the ECU 6 selects the fuel to be supplied in accordance with the operation of the internal combustion state. The "fuel supply control means" according to the seventh aspect of the present invention is implemented when the ECU 6 controls valves V1 and V2, pumps P1 and P2, hydrogen supply injector 18, and gasoline supply injector 19 in accordance with the above fuel selection.

Moreover, in the first embodiment, which has been described above, the "gasoline necessity judgment means" according to the eighth aspect of the present invention is implemented when the ECU 6 judges whether the supply of gasoline is necessary, and the "dehydrogenated gasoline supply judgment means" according to the eighth aspect of the present invention is implemented when the ECU 6 judges whether the amount of existing dehydrogenated product is adequate for supply. In addition, the "hydrogen-rich gas supply judgment means" according to the ninth aspect of the present invention is implemented when the ECU 6 judges whether the amount of existing hydrogen-rich gas is adequate for supply.

In the second embodiment, which has been described above, the dehydrogenation reactor 52 and separator 70 correspond to the "fuel separation means" according to the sixth aspect of the present invention, and the gasoline buffer tank 76, gasoline supply pipe 80, pump 82, gasoline supply injector 50, pump 86, hydrogen buffer tank 84, hydrogen supply pipe 92, and hydrogen supply injector 48 correspond to the "fuel supply means" according to the sixth aspect of the present invention.

Further, in the second embodiment, which has been described above, pump 86, hydrogen buffer tank 84, hydrogen supply pipe 92, and hydrogen supply injector 48 correspond to the "hydrogen-rich gas supply means" according to the tenth aspect of the present invention, and the gasoline buffer tank 76, gasoline supply pipe 80, pump 82, and gasoline supply injector 50 correspond to the "dehydrogenated gasoline supply means" according to the tenth aspect of the present invention. The "fuel selection means" according to the tenth aspect of the present invention is implemented when the ECU 96 performs steps 106 and 112 to 130. The "fuel supply control means" according to the tenth aspect of the present invention is implemented when the ECU 96 performs steps 108 and 110.

Furthermore, in the second embodiment, which has been described above, the "hydrogen-rich gas remaining amount judgment means" according to the eleventh aspect of the present invention is implemented when the ECU 96 performs step 106. The "fuel supply amount calculation means" according to the eleventh aspect of the present invention is implemented when the ECU 96 performs step 108. The "dehydrogenated gasoline remaining amount judgment means" according to the twelfth aspect of the present invention is implemented when the ECU 96 performs step 112.

INDUSTRIAL APPLICABILITY

The hydrogen-fueled internal combustion engine according to the present invention can freely select one or two or more types of fuel from among hydrogenated fuel and a dehydrogenated product and hydrogen, which are obtained by dehydrogenating the hydrogenated fuel, and supply the selected types of fuel to an internal combustion engine. Hydrogen that is obtained by dehydrogenating the hydrogenated fuel can be supplied to the intake system, exhaust system, and combustion chamber of an internal combustion engine without furnishing a high-pressure tank or liquid hydrogen tank and without adsorbing or occluding hydrogen or reforming the fuel. Therefore, the present invention makes it possible to increase the energy use efficiency, reduce the apparatus in size and weight, and construct a clean system.

The invention claimed is:

1. A hydrogen-fueled internal combustion engine that operates upon receipt of one or two or more types of fuel that are selected from hydrogenated fuel and a dehydrogenated product and hydrogen, which dehydrogenated product and hydrogen are obtained by dehydrogenating the hydrogenated fuel, the hydrogen-fueled internal combustion engine comprising:
 a hydrogenated fuel storage section;
 reaction means that includes a catalyst that is positioned to be heatable and dehydrogenates hydrogenated fuel, which is supplied from the hydrogenated fuel storage section, on the catalyst that is heated;
 separation means for separating hydrogen-rich gas and a dehydrogenated product that are derived from dehydrogenation;
 a dehydrogenated product storage section for storing the separated dehydrogenated product;
 fuel supply means for arbitrarily selecting one or more types of fuel from among the hydrogenated fuel stored in the hydrogenated fuel storage section, the hydrogen-rich gas separated by the separation means, and the dehydrogenated product stored in the dehydrogenated product storage section, and supplying the selected types of fuel to the internal combustion engine, the fuel supply means comprising:
 hydrogenated fuel supply means for supplying the hydrogenated fuel to the internal combustion engine;
 hydrogen-rich gas supply means for supplying the hydrogen-rich gas to the internal combustion engine;
 dehydrogenated fuel supply means for supplying the dehydrogenated product to the internal combustion engine; and
 fuel selection means for selecting one or more types of fuel from the hydrogenated fuel, the hydrogen-rich gas, and the dehydrogenated product; and
 fuel supply control means for controlling the hydrogenated fuel supply means, the hydrogen-rich gas supply means, and the dehydrogenated fuel supply means so that the selected types of fuel are supplied to the internal combustion engine;
 fuel necessity judgment means for judging whether the supply of fuel is necessary; and
 dehydrogenated fuel supply judgment means for judging whether the dehydrogenated product can be supplied,
 wherein the fuel supply control means allows the hydrogenated fuel to be supplied to the internal combustion engine only when the necessity for fuel supply is recognized and the dehydrogenated product cannot be supplied.

2. The hydrogen-fueled internal combustion engine according to claim 1, wherein a honeycomb carrier is used as a catalyst carrier.

3. The hydrogen-fueled internal combustion engine according to claim 2, wherein the honeycomb carrier has 45 to 310 cells/cm$^2$ and functions as a catalyst carrier whose ratio between the organic hydride inlet diameter and depth (diameter/depth) ranges from 0.1 to 0.5.

4. The hydrogen-fueled internal combustion engine according to claim 1, wherein the hydrogenated fuel storage section and the dehydrogenated product storage section are both made of an elastic resin material.

5. A hydrogen-fueled internal combustion engine comprising:
 a hydrogenated gasoline tank for storing hydrogenated gasoline containing an organic hydride;
 fuel separation means for separating the hydrogenated gasoline into hydrogen-rich gas and dehydrogenated gasoline;
 fuel supply means for supplying at least one of the hydrogen-rich gas and the dehydrogenated gasoline on an individual basis or simultaneously, among the hydrogenated gasoline, the hydrogen-rich gas, and the dehydrogenated gasoline, to the internal combustion engine as fuel, the fuel supply means comprising:
 hydrogenated gasoline supply means for supplying the hydrogenated gasoline to the internal combustion engine;
 hydrogen-rich gas supply means for supplying the hydrogen-rich gas to the internal combustion engine;
 dehydrogenated gasoline supply means for supplying the dehydrogenated gasoline to the internal combustion engine; and
 fuel selection means for selecting one or more types of fuel from the hydrogenated gasoline, the hydrogen-rich gas, and the dehydrogenated gasoline; and
 fuel supply control means for controlling the hydrogenated gasoline supply means, the hydrogen-rich gas supply means, and the dehydrogenated gasoline supply means so that the selected types of fuel are supplied to the internal combustion engine;
gasoline necessity judgment means for judging whether the supply of gasoline is necessary; and
dehydrogenated gasoline supply judgment means for judging whether the dehydrogenated gasoline can be supplied,
wherein the fuel supply control means allows the hydrogenated gasoline to be supplied to the internal combustion engine only when the necessity for gasoline supply is recognized and the dehydrogenated gasoline cannot be supplied.

6. The hydrogen-fueled internal combustion engine according to claim 5, further comprising:
hydrogen-rich gas supply judgment means for judging whether the hydrogen-rich gas can be supplied,
wherein, when the hydrogen-rich gas and the dehydrogenated gasoline can both be supplied, the fuel supply control means constantly supplies a combination of the hydrogen-rich gas and the dehydrogenated gasoline to the internal combustion engine as fuel.

7. The hydrogen-fueled internal combustion engine according to claim 5, further comprising:
a hydrogen-rich gas tank for storing the hydrogen-rich gas; and
hydrogen-rich gas remaining amount judgment means for judging whether a permissible supply amount is exceeded by the remaining amount of the hydrogen-rich gas,
wherein the fuel supply control means includes fuel supply amount calculation means for calculating the dehydrogenated gasoline supply amount on the assumption that only the dehydrogenated gasoline is supplied to the internal combustion engine, and, when the permissible supply amount is not exceeded by the remaining amount of the hydrogen-rich gas, supplies only the dehydrogenated gasoline to the internal combustion engine in accordance with a fuel supply amount that is calculated by the fuel supply amount calculation means.

8. The hydrogen-fueled internal combustion engine according to claim 5, further comprising:
a dehydrogenated gasoline tank for storing the dehydrogenated gasoline; and
dehydrogenated gasoline remaining amount judgment means for judging whether an upper-limit storage amount is reached by the remaining amount of the dehydrogenated gasoline,
wherein the fuel separation means performs a process for separating the hydrogenated gasoline into the hydrogen-rich gas and the dehydrogenated gasoline in such a manner as to compensate for the amount of hydrogen-rich gas consumption; and
wherein the fuel supply control means supplies only the dehydrogenated gasoline to the internal combustion engine in a situation where the upper-limit storage amount is reached by the remaining amount of the dehydrogenated gasoline.

9. A hydrogen-fueled internal combustion engine that operates upon receipt of one or two or more types of fuel that are selected from hydrogenated fuel and a dehydrogenated product and hydrogen, which dehydrogenated product and hydrogen are obtained by dehydrogenating the hydrogenated fuel, the hydrogen-fueled internal combustion engine comprising:
a hydrogenated fuel storage section;
reaction unit that includes a catalyst that is positioned to be heatable and dehydrogenates hydrogenated fuel, which is supplied from the hydrogenated fuel storage section, on the catalyst that is heated;
separation unit for separating hydrogen-rich gas and a dehydrogenated product that are derived from dehydrogenation; and
a dehydrogenated product storage section for storing the separated dehydrogenated product;
fuel supply means for arbitrarily selecting one or more types of fuel from among the hydrogenated fuel stored in the hydrogenated fuel storage section, the hydrogen-rich gas separated by the separation means, and the dehydrogenated product stored in the dehydrogenated product storage section, and supplying the selected types of fuel to the internal combustion engine, the fuel supply means comprising:
hydrogenated fuel supply means for supplying the hydrogenated fuel to the internal combustion engine;
hydrogen-rich gas supply means for supplying the hydrogen-rich gas to the internal combustion engine;
dehydrogenated fuel supply means for supplying the dehydrogenated product to the internal combustion engine; and
fuel selection means for selecting one or more types of fuel from the hydrogenated fuel, the hydrogen-rich gas, and the dehydrogenated product; and
fuel supply control means for controlling the hydrogenated fuel supply means, the hydrogen-rich gas supply means, and the dehydrogenated fuel supply means so that the selected types of fuel are supplied to the internal combustion engine;
fuel necessity judgment means for judging whether the supply of fuel is necessary; and
dehydrogenated fuel supply judgment means for judging whether the dehydrogenated product can be supplied,
wherein the fuel supply control means allows the hydrogenated fuel to be supplied to the internal combustion engine only when the necessity for fuel supply is recognized and the dehydrogenated product cannot be supplied.

10. A hydrogen-fueled internal combustion engine comprising:
a hydrogenated gasoline tank for storing hydrogenated gasoline containing an organic hydride;
fuel separation unit for separating the hydrogenated gasoline into hydrogen-rich gas and dehydrogenated gasoline; and
fuel supply unit for supplying at least the hydrogen-rich gas and/or the dehydrogenated gasoline on an individual basis or simultaneously, among the hydrogenated gasoline, the hydrogen-rich gas, and the dehydrogenated gasoline, to the internal combustion engine as fuel, the fuel supply means comprising:
hydrogenated gasoline supply means for supplying the hydrogenated gasoline to the internal combustion engine;
hydrogen-rich gas supply means for supplying the hydrogen-rich gas to the internal combustion engine;
dehydrogenated gasoline supply means for supplying the dehydrogenated gasoline to the internal combustion engine; and
fuel selection means for selecting one or more types of fuel from the hydrogenated gasoline, the hydrogen-rich gas, and the dehydrogenated gasoline; and
fuel supply control means for controlling the hydrogenated gasoline supply means, the hydrogen-rich gas supply means, and the dehydrogenated gasoline supply means so that the selected types of fuel are supplied to the internal combustion engine;
gasoline necessity judgment means for judging whether the supply of gasoline is necessary; and
dehydrogenated gasoline supply judgment means for judging whether the dehydrogenated gasoline can be supplied,
wherein the fuel supply control means allows the hydrogenated gasoline to be supplied to the internal combustion engine only when the necessity for gasoline supply is recognized and the dehydrogenated gasoline cannot be supplied.

* * * * *

UNITED STATES PATENT AND TRADEMARK OFFICE
CERTIFICATE OF CORRECTION

| | | |
|---|---|---|
| PATENT NO. | : 7,448,348 B2 | Page 1 of 1 |
| APPLICATION NO. | : 10/572904 | |
| DATED | : November 11, 2008 | |
| INVENTOR(S) | : Tomohiro Shinagawa and Takashi Atsumi | |

It is certified that error appears in the above-identified patent and that said Letters Patent is hereby corrected as shown below:

Title page, under item [*] Notice Remove statement "This patent is subject to a terminal disclaimer."

Signed and Sealed this

Thirtieth Day of December, 2008

JON W. DUDAS
*Director of the United States Patent and Trademark Office*